United States Patent
Kawanishi et al.

(10) Patent No.: US 12,548,857 B2
(45) Date of Patent: Feb. 10, 2026

(54) SINGLE CONDUCTOR LAYER CELL-TO-CELL INTERCONNECT FOR ELECTRIC VEHICLE POWER SUPPLY OR OTHER POWER SUPPLY

(71) Applicant: Canoo Technologies Inc., Torrance, CA (US)

(72) Inventors: Kenneth Kawanishi, Whittier, CA (US); Deborah A. Bourke, San Diego, CA (US); Seth Lewis, Monrovia, CA (US); Cody J. Rhebergen, Lomita, CA (US); Berton Vite, Huntington Beach, CA (US); Phillip J. Weicker, Los Angeles, CA (US)

(73) Assignee: CANOO TECHNOLOGIES INC., Torrance, CA (US)

( * ) Notice: Subject to any disclaimer, the term of this patent is extended or adjusted under 35 U.S.C. 154(b) by 697 days.

(21) Appl. No.: 17/812,927

(22) Filed: Jul. 15, 2022

(65) Prior Publication Data

US 2023/0046621 A1    Feb. 16, 2023

Related U.S. Application Data

(60) Provisional application No. 63/233,127, filed on Aug. 13, 2021.

(51) Int. Cl.
*H01M 50/507*    (2021.01)
*B60L 50/64*    (2019.01)
(Continued)

(52) U.S. Cl.
CPC ........... *H01M 50/507* (2021.01); *B60L 50/64* (2019.02); *H01M 50/213* (2021.01);
(Continued)

(58) Field of Classification Search
CPC ............. H01M 50/507; H01M 50/213; H01M 50/284; H01M 50/296; H01M 50/298;
(Continued)

(56) References Cited

U.S. PATENT DOCUMENTS

| | | |
|---|---|---|
| 8,852,772 B2 | 10/2014 | McDonald |
| 9,065,103 B2 | 6/2015 | Straubel et al. |

(Continued)

FOREIGN PATENT DOCUMENTS

| | | |
|---|---|---|
| CN | 105990620 A | 10/2016 |
| JP | 2015-053205 A | 3/2015 |

(Continued)

OTHER PUBLICATIONS

Cadex, "Powering BioMedical Devices," Battery University, Nov. 2020, 25 pages.

(Continued)

*Primary Examiner* — Eugenia Wang
(74) *Attorney, Agent, or Firm* — ALLEN, DYER, DOPPELT, + GILCHRIST, P.A.

(57) ABSTRACT

An apparatus includes an interconnect assembly configured to receive and retain multiple batteries. The interconnect assembly includes a retainer configured to receive portions of the batteries and a conductive interconnect layer carried by the retainer. The conductive interconnect layer includes a first layer of conductive material having a first thickness and a second layer of conductive material having a second thickness less than the first thickness. The first and second layers of conductive material are attached together to form the conductive interconnect layer. The second layer of conductive material includes multiple interconnects configured to be coupled to cathodes and anodes of the batteries.

23 Claims, 32 Drawing Sheets

(51) Int. Cl.
*H01M 50/213* (2021.01)
*H01M 50/284* (2021.01)
*H01M 50/296* (2021.01)
*H01M 50/298* (2021.01)
*H01M 50/503* (2021.01)
*H01M 50/509* (2021.01)
*H01M 50/516* (2021.01)
*H01M 50/526* (2021.01)
*H01M 50/569* (2021.01)

(52) U.S. Cl.
CPC ....... *H01M 50/284* (2021.01); *H01M 50/296* (2021.01); *H01M 50/298* (2021.01); *H01M 50/503* (2021.01); *H01M 50/509* (2021.01); *H01M 50/516* (2021.01); *H01M 50/526* (2021.01); *H01M 50/569* (2021.01); *H01M 2220/20* (2013.01)

(58) Field of Classification Search
CPC ............. H01M 50/503; H01M 50/509; H01M 50/516; H01M 50/526; H01M 50/569; H01M 2220/20; H01M 10/482; H01M 10/462; B60L 50/64; B60L 50/66; B60L 58/21; Y02E 60/10
See application file for complete search history.

(56) References Cited

U.S. PATENT DOCUMENTS

| | | |
|---|---|---|
| 9,147,875 B1 | 9/2015 | Coakley et al. |
| 9,947,912 B2 | 4/2018 | Nakamura et al. |
| 10,720,626 B2 | 7/2020 | Harris et al. |
| 2006/0019155 A1 | 1/2006 | Seman, Jr. et al. |
| 2010/0075205 A1 | 3/2010 | Kwag et al. |
| 2011/0135975 A1 | 6/2011 | Fuhr et al. |
| 2011/0223468 A1 | 9/2011 | Ferber, Jr. |
| 2013/0130074 A1 | 5/2013 | Timmons et al. |
| 2013/0189560 A1 | 7/2013 | Widhalm |
| 2014/0097797 A1* | 4/2014 | Hendrix ............ H01M 10/4207 320/118 |
| 2014/0212695 A1 | 7/2014 | Lane et al. |
| 2014/0255748 A1 | 9/2014 | Jan et al. |
| 2014/0335381 A1 | 11/2014 | Krolak |
| 2015/0214586 A1 | 7/2015 | Yeow et al. |
| 2015/0280295 A1 | 10/2015 | Bhunia et al. |
| 2015/0325824 A1 | 11/2015 | Hasegawa et al. |
| 2016/0133908 A1* | 5/2016 | Zhao ................ H01M 50/522 429/90 |
| 2016/0380319 A1 | 12/2016 | Rhein et al. |
| 2017/0005316 A1 | 1/2017 | Harris et al. |
| 2017/0047574 A1 | 2/2017 | Fees et al. |
| 2017/0125773 A1 | 5/2017 | Liu |
| 2018/0097265 A1 | 4/2018 | Tarlau et al. |
| 2018/0145382 A1 | 5/2018 | Harris et al. |
| 2018/0212222 A1 | 7/2018 | Barton et al. |
| 2019/0081308 A1 | 3/2019 | Capati et al. |
| 2019/0081370 A1 | 3/2019 | Capati et al. |
| 2020/0144676 A1 | 5/2020 | Tsuruta et al. |
| 2020/0274184 A1 | 8/2020 | Eichhorn et al. |
| 2021/0098765 A1 | 4/2021 | Weinberger et al. |

FOREIGN PATENT DOCUMENTS

| | | |
|---|---|---|
| JP | 2015-099726 A | 5/2015 |
| JP | 2015-144054 A | 8/2015 |
| WO | 2018/094187 A1 | 5/2018 |
| WO | 2018/126136 A1 | 7/2018 |

OTHER PUBLICATIONS

Dyson, "The Dyson Battery Electric Vehicle," Dyson Newsroom, Jun. 2020, 13 pages.
Kwai, "Illustration of a Wire Bonding Process," YouTube Video, Jan. 2014, https://www.youtube.com/watch?v=FRvECYvlaT0.
MarkLines Automotive Industry Portal, "Tesla Model 3 Teardown; Motor, Inverter, and Battery," Information Platform, Mar. 2019, 8 pages.
MunroLive, "Tesla 4680 Battery Pack Prophecy," YouTube Video, Nov. 2020, https://www.youtube.com/watch?v=KJIEiZpJg2cv.
Sunstone Welders/Orion Welders, "Resistance Welding with CD600DPA 0.005" Nickel to 18650 Battery, YouTube Video, Mar. 2021, https://www.youtube.com/watch?v=FC0GpZ_W7MY.
Woodbury, "Wire bonding Tango Battery Module," YouTube Video, Aug. 2018, https://www.youtube.com/watch?v=flU1ivte0bc.
Wu, "(Laser Welding) 250PPM 18650 Laser Welding," YouTube Video, Dec. 2018, https://www.youtube.com/watch?v=JJlurLKAJzM.
International Search Report and Written Opinion dated Nov. 21, 2022 in connection with International Patent Application No. PCT/US2022/037336, 12 pages.
International Search Report and Written Opinion dated Oct. 19, 2022 in connection with International Patent Application No. PCT/US22/37341, 13 pages.

* cited by examiner

SINGLE CONDUCTOR LAYER CELL-TO-CELL INTERCONNECT FOR ELECTRIC VEHICLE POWER SUPPLY OR OTHER POWER SUPPLY

CROSS-REFERENCE TO RELATED APPLICATION AND PRIORITY CLAIM

This application claims priority under 35 U.S.C. § 119(e) to U.S. Provisional Patent Application No. 63/233,127 filed on Aug. 13, 2021. This provisional application is hereby incorporated by reference in its entirety.

TECHNICAL FIELD

This disclosure relates generally to power supplies. More specifically, this disclosure relates to a single conductor layer cell-to-cell interconnect for an electric vehicle power supply or other power supply.

BACKGROUND

An electric vehicle includes a power supply that provides electrical power to one or more electric motors and other components of the electric vehicle. In some cases, the power supply may include a large number of battery cells (referred to as "batteries") that are connected in various series and parallel combinations. During operation, the batteries collectively operate to provide the electrical power for the electric vehicle. Unfortunately, electric vehicle power supplies can suffer from a number of shortcomings in their designs.

SUMMARY

This disclosure provides a single conductor layer cell-to-cell interconnect for an electric vehicle power supply or other power supply.

In a first embodiment, an apparatus includes an interconnect assembly configured to receive and retain multiple batteries. The interconnect assembly includes a retainer configured to receive portions of the batteries and a conductive interconnect layer carried by the retainer. The conductive interconnect layer includes a first layer of conductive material having a first thickness and a second layer of conductive material having a second thickness less than the first thickness. The first and second layers of conductive material are attached together to form the conductive interconnect layer. The second layer of conductive material includes multiple interconnects configured to be coupled to cathodes and anodes of the batteries.

In a second embodiment, a system includes one or more power supply modules configured to provide electrical power. Each power supply module includes an interconnect assembly configured to receive and retain multiple batteries. The interconnect assembly includes (i) a retainer configured to receive portions of the batteries, (ii) a conductive interconnect layer carried by the retainer, and (iii) terminal connectors electrically coupled to the batteries and configured to provide at least a portion of the electrical power. The conductive interconnect layer includes a first layer of conductive material having a first thickness and a second layer of conductive material having a second thickness less than the first thickness. The first and second layers of conductive material are attached together to form the conductive interconnect layer. The second layer of conductive material includes multiple interconnects configured to be coupled to cathodes and anodes of the batteries.

In a third embodiment, a method includes inserting multiple batteries into an interconnect assembly that is configured to receive and retain the batteries. The interconnect assembly includes a retainer configured to receive portions of the batteries and a conductive interconnect layer carried by the retainer. The conductive interconnect layer includes a first layer of conductive material having a first thickness and a second layer of conductive material having a second thickness less than the first thickness. The first and second layers of conductive material are attached together to form the conductive interconnect layer. The method also includes attaching interconnects in the second layer of conductive material to cathodes and anodes of the batteries.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
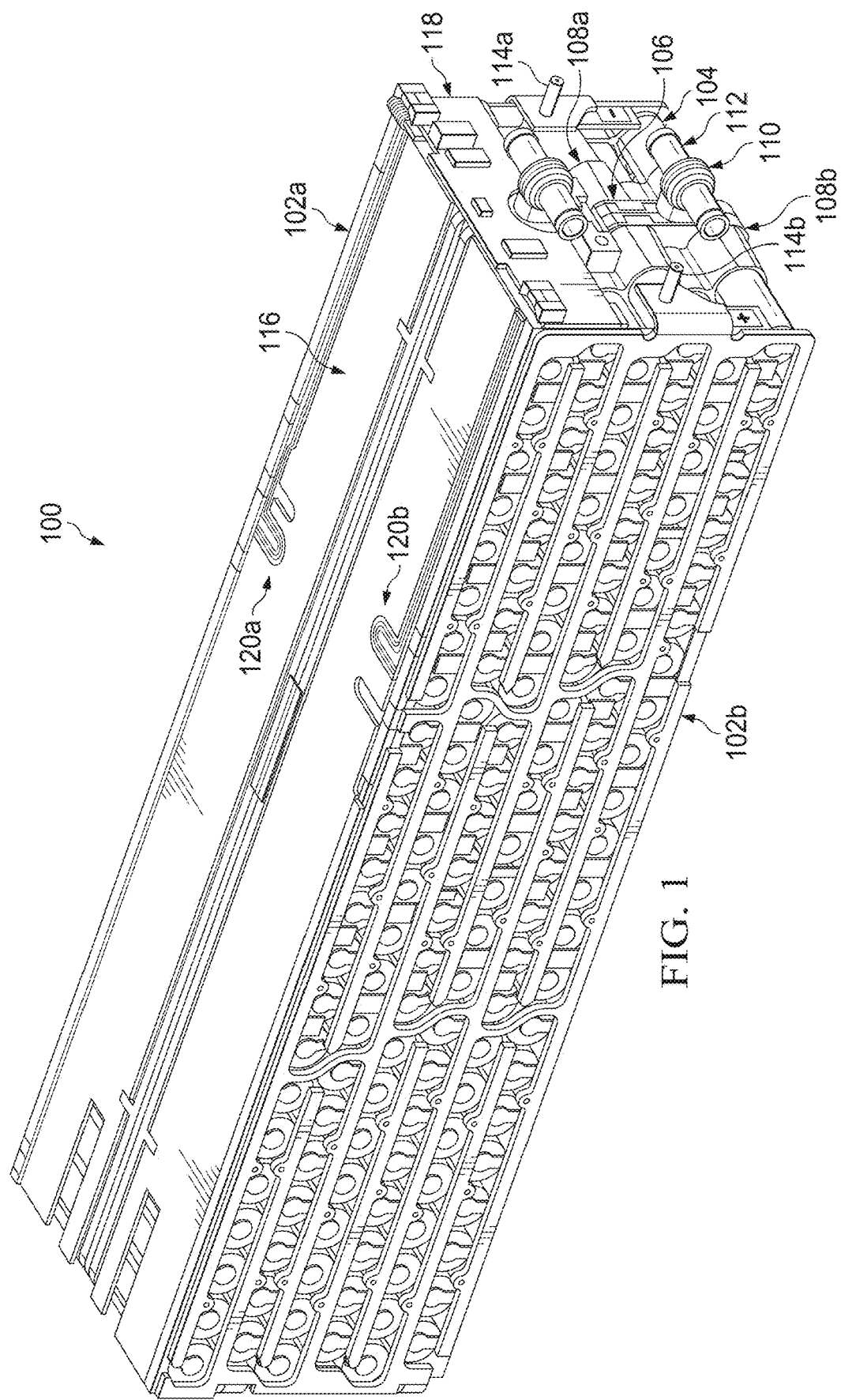
FIG. 1 illustrates an example interconnect assembly for use in an electric vehicle or other system according to this disclosure.

FIGS. 1 through 17, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, an electric vehicle includes a power supply that provides electrical power to one or more electric motors and other components of the electric vehicle. In some cases, the power supply may include a large number of battery cells (referred to as "batteries") that are connected in various series and parallel combinations. During operation, the batteries collectively operate to provide the electrical power for the electric vehicle. Unfortunately, electric vehicle power supplies can suffer from a number of shortcomings in their designs.

As particular examples of various shortcomings, an electric vehicle power supply needs to ensure that electrical isolation exists between positive and negative pathways to and from the batteries in order to avoid the creation of short circuits. However, electric vehicle power supplies often have tight clearances and limited visibility, which can make it difficult to properly couple electrical pathways to the batteries (such as via laser welding). Also, certain types of batteries (such as lithium ion batteries) are temperature-sensitive, and some electric vehicle power supplies may allow batteries to reach significantly different temperatures, which can negatively impact power supply performance. Further, electric vehicle power supplies may often include temperature and voltage sensors to monitor characteristics of the batteries, but the temperature and voltage sensors often use different harnesses and wiring. Moreover, electric vehicle power supplies may be implemented using multiple modules, where each module includes a number of batteries and the modules themselves can be coupled in series and parallel arrangements to provide desired electrical power. However, connection points for the modules may be complex, which increases the size, weight, and cost of the power supplies. In addition, electric vehicle power supplies may lack adequate structural integrity in some cases. Finally, electric vehicle power supplies may suffer from various uniformity issues, such as electrical current or resistance network uniformity issues, that can negatively affect the operation of the power supplies.

This disclosure describes various embodiments of a single conductor layer cell-to-cell interconnect for an electric vehicle power supply or other power supply. As described in more detail below, an interconnect or interconnect assembly couples multiple batteries together in series and parallel arrangements as needed or desired to form a power supply module. One or more instances of the power supply module may be used to form a power supply for an electric vehicle or other larger system that uses electrical power. Each battery has a cathode and an anode that couple to a single conductive layer in an interconnect assembly, and the conductive layer includes conductive fingers and various positive and negative interconnects or connection tabs at appropriate locations to form series and parallel connections with the batteries. Terminal connectors are also provided for convenient coupling of each interconnect assembly to other interconnect assemblies or other components of a larger system.

The embodiments of the interconnect assemblies described below may substantially or completely overcome many of the shortcomings discussed above. For example, the interconnect assemblies help to ensure that electrical isolation exists between positive and negative pathways to and from the batteries, even in the presence of tight clearances. Also, the interconnect assemblies may provide improved visibility, which can help to support operations such as laser welding. Moreover, various improvements may be used to help batteries maintain more consistent temperatures within the interconnect assemblies, and integrated temperature and voltage sensing can be used to monitor the characteristics of the batteries. Further, multiple interconnect assemblies may be used to form multiple modules of a power supply, and the interconnect assemblies provide for simple connections of the modules in series and parallel arrangements. In addition, the interconnect assemblies may provide for improved structural integrity, and various uniformity issues (such as electrical current or resistance network uniformity issues) can be improved in the interconnect assemblies.

FIG. 1 illustrates an example interconnect assembly 100 for use in an electric vehicle or other system according to this disclosure. The interconnect assembly 100 may, for example, represent or form one power supply module, and one or more power supply modules may be used to form a power supply for an electric vehicle or other system.

As shown in FIG. 1, the interconnect assembly 100 includes two sub-modules 102a-102b, where each sub-module 102a-102b is used to receive and form electrical connections with a number of batteries 104. Each sub-module 102a-102b may receive and form electrical connections with any suitable number of batteries 104. In some cases, for instance, each sub-module 102a-102b may receive and retain one hundred and thirty eight batteries 104, and the interconnect assembly 100 collectively may receive and retain two hundred and seventy six batteries 104 (although this is for illustration only). Also, any suitable series and parallel connections may be defined by the interconnect assembly 100 for the batteries 104. In some cases, for example, the interconnect assembly 100 may define a "6S46P" configuration, meaning the interconnect assembly 100 includes six series-coupled collections of forty six batteries 104 coupled in parallel. In that example, each sub-module 102a-102b may define a "3S46P" configuration, meaning each sub-module 102a-102b includes three series-coupled collections of forty six batteries 104 coupled in parallel. However, other arrangements of batteries 104 may be used in each sub-module 102a-102b and in the interconnect assembly 100.

Each battery 104 may represent a cylindrical battery having both positive and negative terminals of the battery (meaning a cathode and an anode of the battery) at one end of the battery. For instance, each battery 104 may include a cathode forming a raised central portion of one end of the battery 104 and an anode forming a thin annular region around the cathode. Note, however, that the size and shape of the batteries 104 may vary as needed or desired.

A coldplate 106 is used to help cool the batteries 104 and other components of the interconnect assembly 100. The coldplate 106 may be formed from any suitable material, such as one or more materials having high thermal conductivity. The coldplate 106 may also be formed in any suitable manner. In this example, the coldplate 106 includes or is thermally coupled to a cell retainer 108a forming part of the sub-module 102a and a cell retainer 108b forming part of the sub-module 102b. Each cell retainer 108a-108b represents a structure that is configured to receive portions of multiple batteries 104 and to retain the batteries 104 within the cell retainer 108a-108b. In this way, the cell retainers 108a-108b help to maintain the batteries 104 at desired positions within the interconnect assembly 100. Each cell retainer 108a-108b may be formed from any suitable material, such as one or more materials having high thermal conductivity, and in any suitable manner.

In this example, each sub-module 102a-102b includes one or more projections 110, and each projection 110 defines an opening. When the projections 110 of the sub-modules 102a-102b are aligned, one or more rods 112 may be inserted through the openings of the projections 110 in order to help secure the sub-modules 102a-102b together (at least at the illustrated end of the interconnect assembly 100). Each projection 110 and each rod 112 may have any suitable size and shape. Note, however, that other mechanisms for securing the sub-modules 102a-102b together may be used here.

Each sub-module 102a-102b also respectively includes a terminal connector 114a-114b. The terminal connectors 114a-114b represent structures that can be electrically coupled to cables, wiring, or other electrical conductors in order to electrically couple the interconnect assembly 100 to other interconnect assemblies or other components in a larger system. In this example, for instance, the terminal connector 114a represents a negative terminal, and the terminal connector 114b represents a positive terminal. Coupling the terminal connectors 114a-114b to electrical conductors allows the interconnect assembly 100 to output electrical power to the larger system. If multiple interconnect assemblies 100 are coupled together in series, the interconnect assemblies 100 can operate to collectively produce a larger electrical voltage. If multiple interconnect assemblies 100 are coupled together in parallel, the interconnect assemblies 100 can operate to collectively produce a larger electrical current. Various series and parallel arrangements of the interconnect assemblies 100 may be used to achieve the desired electrical voltage and electrical current. Each terminal connector 114a-114b represents any suitable structure configured to be coupled to an electrical conductor, such as a threaded stud or other threaded post.

Various stiffening plates 116 may be used to provide structural reinforcement and increase the structural integrity of the interconnect assembly 100. For example, the stiffening plates 116 may be coupled to other components of the interconnect assembly 100 like the coldplate 106 (such as via an adhesive), and the stiffening plates 116 may operate to reduce or prevent deformations of the interconnect assembly 100 or otherwise improve the structural integrity of the interconnect assembly 100. Each stiffening plate 116 may be formed from any suitable material, such as one or more metals, and in any suitable manner.

A control board 118 is coupled to one or more sensor assemblies 120a-120b. The one or more sensor assemblies 120a-120b may be used to sense temperature, voltage, or other characteristics in the interconnect assembly 100. In some cases, each sensor assembly 120a-120b can support integrated temperature and voltage sensing. The control board 118 may include at least one microprocessor, microcontroller, digital signal processor (DSP), application specific integrated circuit (ASIC), field programmable gate array (FPGA), or other components for processing or outputting measurements from the one or more sensor assemblies 120a-120b. For example, the control board 118 may shut down or otherwise modify the operation of the interconnect assembly 100 (or provide information to an external component that can shut down or otherwise modify the operation of the interconnect assembly 100) in response to an over-voltage or over-temperature condition. The control board 118 may also operate to pass measurements from the sensor assemblies 120a-120b to an external component, such as an external control system, for use in controlling the interconnect assembly 100.

Although FIG. 1 illustrates one example of an interconnect assembly 100 for use in an electric vehicle or other system, various changes may be made to FIG. 1. For example, the interconnect assembly 100 and each of its individual components may have any suitable size, shape, and dimensions. Also, the interconnect assembly 100 may be used with any suitable number of batteries in any suitable arrangement to produce any suitable electrical voltage and electrical current. Various additional features and example implementations of various features of the interconnect assembly 100 are provided below.

Figure 2:
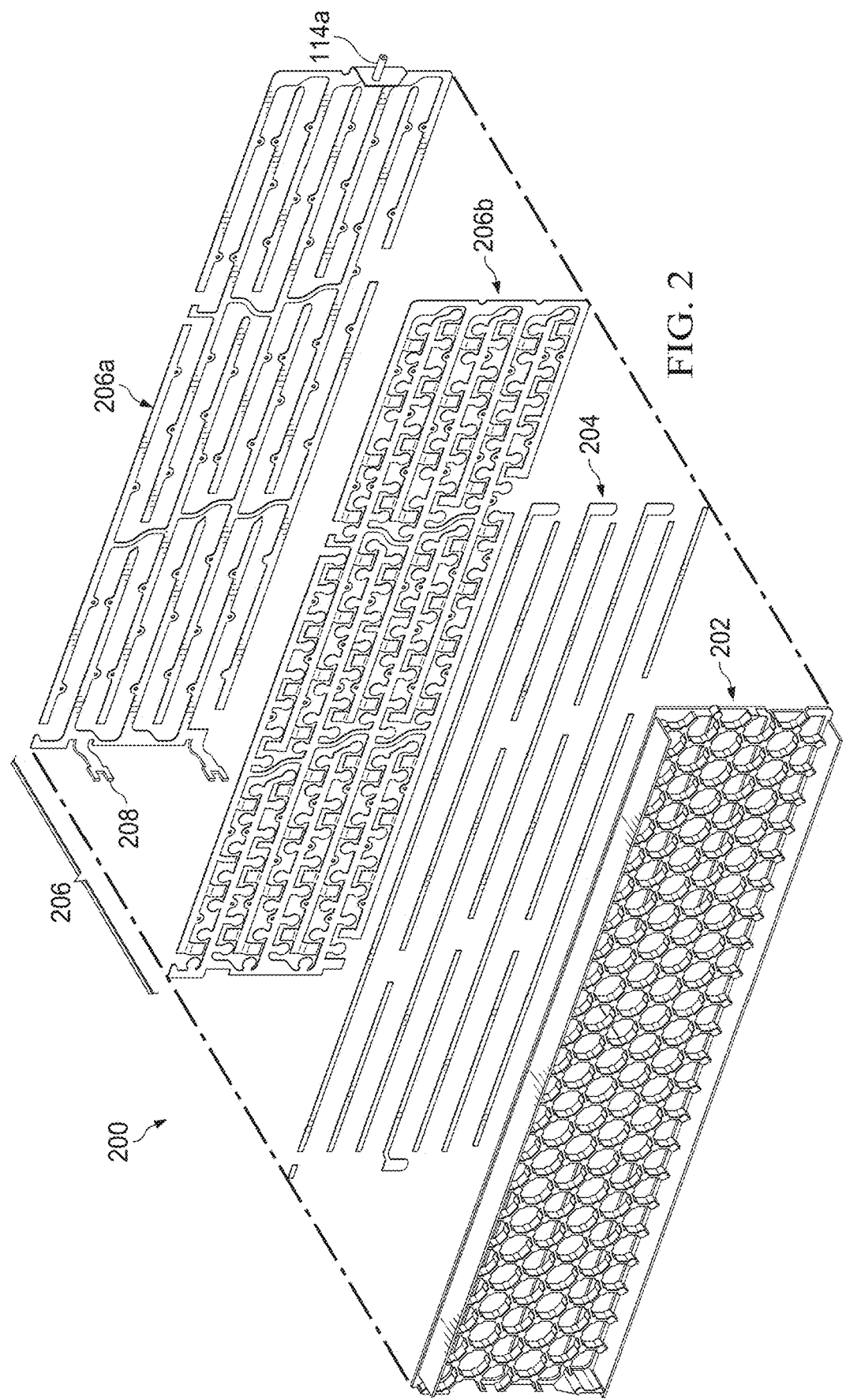
FIG. 2 illustrates an example portion of a sub-module in an interconnect assembly according to this disclosure.

FIG. 2 illustrates an example portion 200 of a sub-module 102a in an interconnect assembly 100 according to this disclosure. The portion 200 of the sub-module 102a shown in FIG. 2 includes various structures used to form electrical connections with some of the batteries 104 in the interconnect assembly 100. This portion 200 of the sub-module 102a may represent the outermost portion of the interconnect assembly 100 on the back side of the interconnect assembly 100 as shown in FIG. 1. A similar structure may be used in the sub-module 102b to form electrical connections with other batteries 104 in the interconnect assembly 100, but the polarities of the electrical connections may be reversed as described below. The similar structure used in the sub-module 102b may represent the closest portion of the interconnect assembly 100 on the front side of the interconnect assembly 100 as shown in FIG. 1.

As shown in FIG. 2, this portion 200 of the sub-module 102a includes an interconnect retainer 202, an adhesive layer 204, and two layers 206a-206b collectively forming a single conductive interconnect layer 206. The interconnect retainer 202 generally represents a structure that cooperates with the cell retainer 108a to hold batteries 104 in place within the sub-module 102a and to hold conductive interconnects of the conductive interconnect layer 206 at suitable locations relative to the batteries 104 in the sub-module 102a. A similar interconnect retainer may cooperate with the cell retainer 108b to hold batteries 104 in place within the sub-module 102b and to hold conductive interconnects of a single conductive interconnect layer at suitable locations relative to the batteries 104 in the sub-module 102b. The interconnect retainer 202 may be formed from any suitable material, such as one or more electrically-insulative materials like plastic, and in any suitable manner.

The adhesive layer 204 represents a layer of adhesive that can be used to secure the conductive interconnect layer 206 to the interconnect retainer 202. As described in more detail below, in some embodiments, the adhesive layer 204 may be placed into recesses or grooves of the interconnect retainer 202 and used to couple conductive fingers and other portions of the conductive interconnect layer 206 to the interconnect retainer 202. The adhesive layer 204 includes any suitable adhesive that couples components together. Note, however, that other mechanisms may be used to secure the conductive interconnect layer 206 to the interconnect retainer 202.

The layers 206a-206b represent layers of one or more conductive materials that can be coupled to one another in order to form a single conductive layer that is carried by the interconnect retainer 202 and electrically coupled to the batteries 104 in the sub-module 102a. As described in more detail below, the layer 206a may represent a layer of conductive material that can transport larger amounts of electrical current, and the layer 206b may represent a layer of conductive material that can transport smaller amounts of electrical current. For example, the layer 206a may have thicker and/or wider portions of conductive material compared to the layer 206b. The layers 206a-206b may be formed using any suitable conductive material, such as aluminum or copper, and in any suitable manner. In some cases, the layer 206a may represent a layer of aluminum that is about three millimeters thick, and the layer 206b may represent a layer of aluminum that is about 0.25 millimeters thick. In these or other embodiments, the layer 206b may represent a foil that can be easily manipulated to couple portions of the layer 206b to the batteries 104.

At one end of the conductive interconnect layer 206 is the terminal connector 114a, which allows the conductive interconnect layer 206 to be coupled to an electrical conductor as described above. At the opposite end of the conductive interconnect layer 206 are multiple conductive forks 208, which are used to couple the conductive interconnect layer 206 of the sub-module 102a to the conductive interconnect layer of the sub-module 102b. The conductive interconnect layer of the sub-module 102b includes the terminal connector 114b. The conductive forks 208 thereby help to form electrical connections between the sub-modules 102a-102b so that a complete electrical pathway exists between the terminal connectors 114a-114b.

Although FIG. 2 illustrates one example of a portion 200 of a sub-module 102a in an interconnect assembly 100, various changes may be made to FIG. 2. For example, the sub-module 102a and each of its individual components may have any suitable size, shape, and dimensions. Also, this portion 200 of the sub-module 102a may be modified to support use with other suitable numbers of batteries and batteries in other suitable configurations.

Figure 3A:
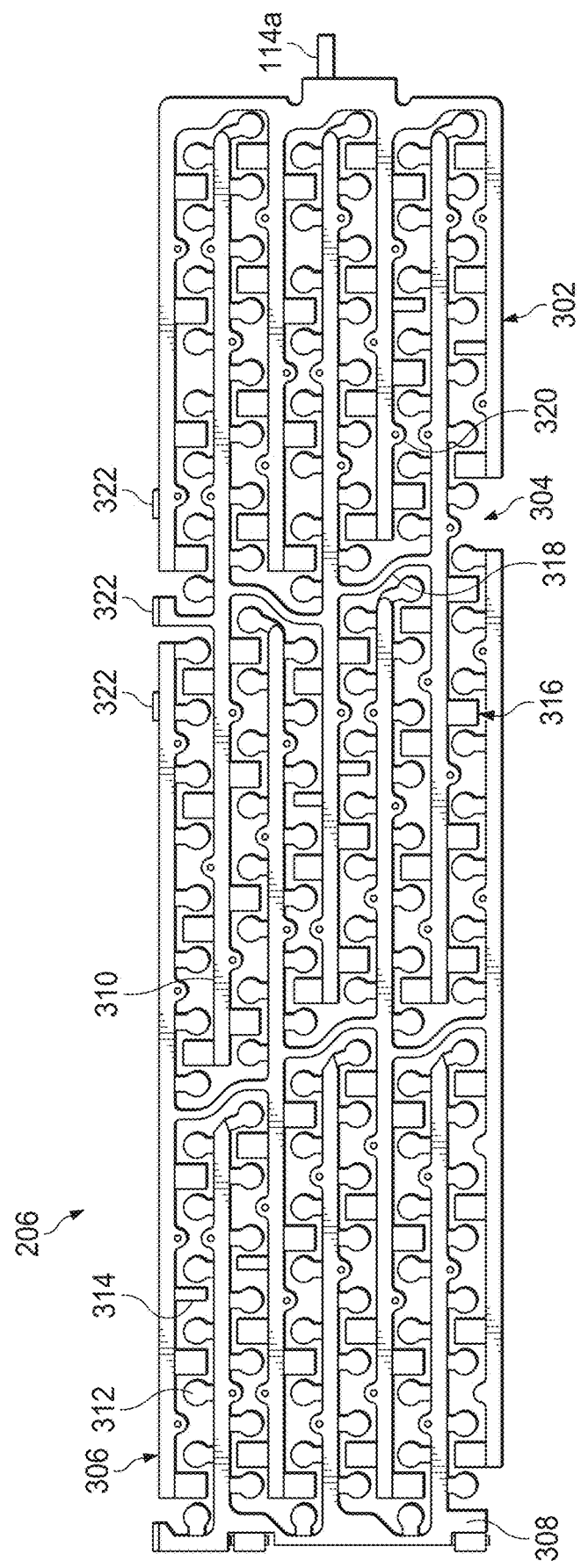
FIGS. 3A and 3B illustrate an example conductive interconnect layer of a sub-module in an interconnect assembly according to this disclosure.
Figure 3B:
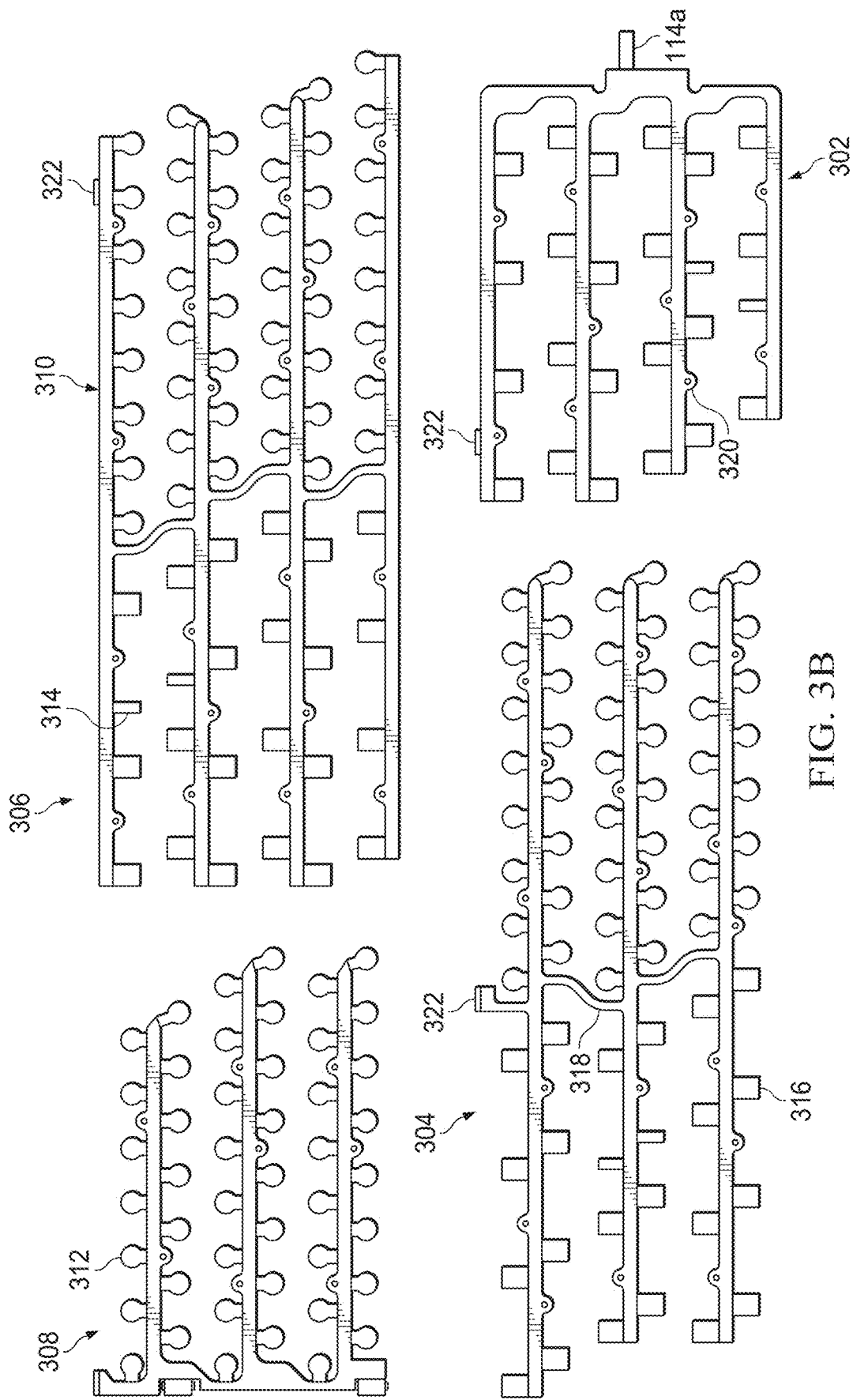

FIGS. 3A and 3B illustrate an example conductive interconnect layer 206 of a sub-module 102a in an interconnect assembly 100 according to this disclosure. As shown in FIGS. 3A and 3B, the conductive interconnect layer 206 is formed here using four distinct conductive structures 302-308, each of which includes elongated conductive fingers 310. The conductive fingers 310 of different conductive structures 302-308 are interdigitated or interleaved with one another. The elongated fingers 310 are also interleaved in terms of polarity, meaning one elongated finger 310 and an adjacent elongated finger 310 have opposite polarities in terms of connections to the batteries 104. In this example, the conductive structure 302 represents a negative connection structure, meaning the conductive structure 302 is coupled to negative terminals of batteries 104. The conductive structure 308 represents a positive connection structure, meaning the conductive structure 308 is coupled to positive terminals of batteries 104. The conductive structures 304 and 306 represent series connection structures, meaning each conductive structure 304 and 306 is coupled to positive terminals of batteries 104 on one side of the structure and to negative terminals of batteries 104 on the other side of the structure.

The elongated fingers 310 are conductive and are able to transport electrical currents from batteries 104 (during use of the interconnect assembly 100) or to the batteries 104 (during charging of the batteries 104). In this example, the elongated fingers 310 are electrically coupled to three types of connections to the batteries 104. Positive or single-cathode interconnects 312 are represented using generally circular structures, and each interconnect 312 connects to a positive terminal of one battery 104. Single negative or single-anode interconnects 314 are represented using thinner generally rectangular structures, and each interconnect 314 connects to a negative terminal of one battery 104. Double negative or double-anode interconnects 316 are represented using wider generally rectangular structures, and each interconnect 316 connects to two negative terminals of two batteries 104.

Figure 4:
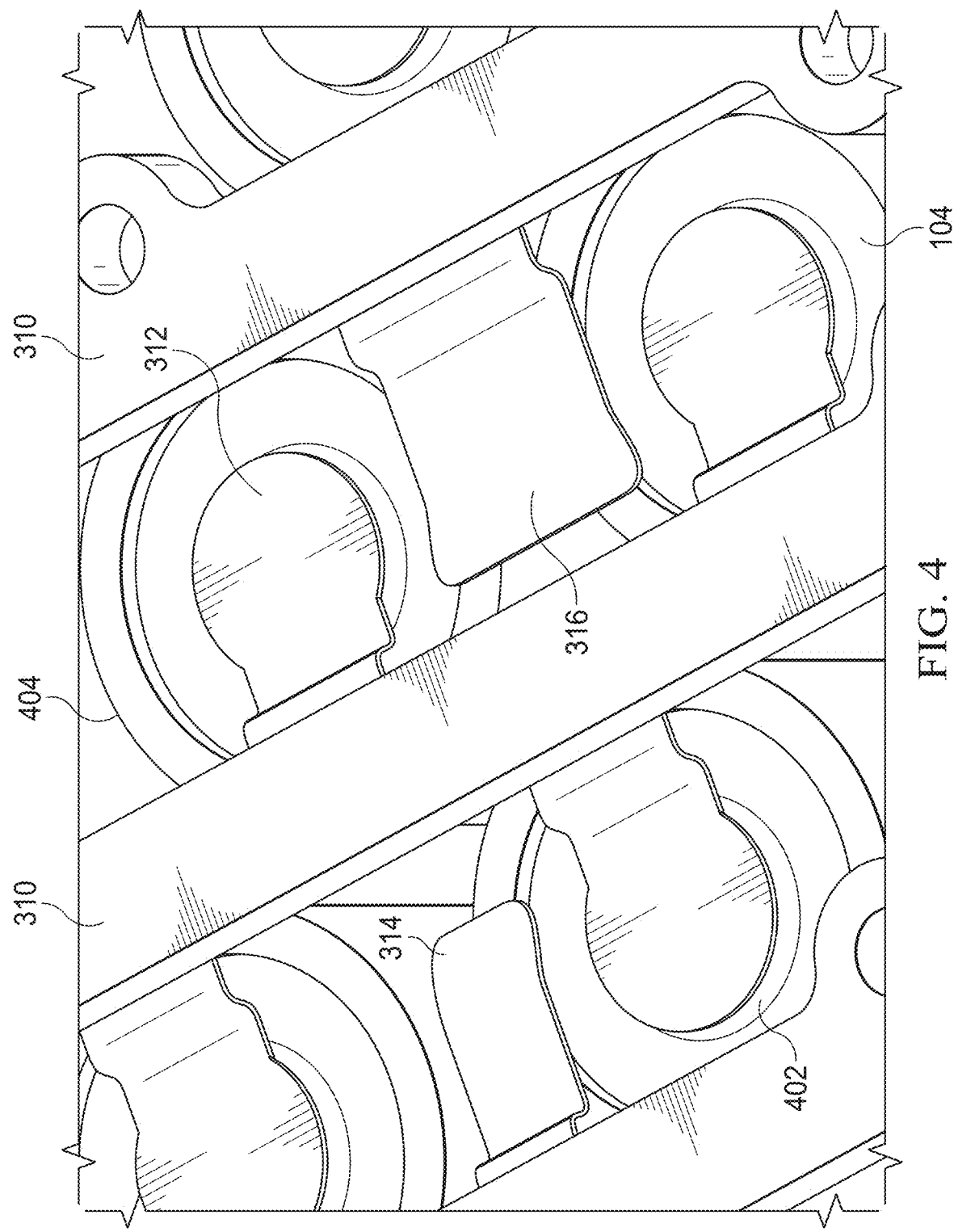
FIG. 4 illustrates example interconnects of a conductive interconnect layer to batteries in an interconnect assembly according to this disclosure.

FIG. 4 illustrates example interconnects 312-316 of a conductive interconnect layer 206 to batteries 104 in an interconnect assembly 100 according to this disclosure. As can be seen here, each battery 104 may include a raised cathode 402 and an annular anode 404. Each interconnect 312 can be sized and shaped to be coupled to the cathode 402 of a single battery 104 without also contacting the anodes 404 of any batteries 104. Each interconnect 314 can be sized and shaped to be coupled to the anode 404 of a single battery 104 without also contacting the cathodes 402 any batteries 104. Each interconnect 316 can be sized and shaped to be coupled to the anodes 404 of two neighboring batteries 104 without also contacting the cathodes 402 of any batteries 104. Bends in the interconnects 312-316 allow the interconnects 312-316 to extend from the conductive fingers 310 to the batteries 104. The conductive fingers 310 are positioned above the batteries 104 and therefore do not physically contact the cathodes 402 or anodes 404 of the batteries 104. As described below, in some embodiments, laser welding may be used to physically attach the interconnects 312-316 to the cathodes 402 and anodes 404 of the batteries 104.

The conductive structures 304 and 306 shown in FIGS. 3A and 3B also include balancing conductors 318. Each balancing conductor 318 electrically couples neighboring fingers 310 in the associated conductive structure 304 and 306. The balancing conductors 318 are useful since various fingers 310 of the conductive structures 304 and 306 are coupled to different numbers of batteries 104. For example, in the conductive structure 304, the bottom left finger 310 can be coupled to sixteen batteries (since there are eight double-anode interconnects 316), but the bottom right finger 310 can be coupled to fourteen batteries (since there are fourteen cathode interconnects 312). Without the balancing conductors 318, the different numbers of batteries 104 coupled to the fingers 310 of the conductive structures 304 and 306 may create various issues, such as when temperatures of the batteries 104 vary due to some batteries 104 sourcing or sinking more current than other batteries 104. The balancing conductors 318 allow electrical currents to flow as needed between different fingers 310 in order to accommodate different numbers of batteries 104 coupled to the fingers 310. Each balancing conductor 318 may be formed from any suitable conductive material, such as aluminum or copper, and in any suitable manner.

The conductive structures 302-308 shown in FIGS. 3A and 3B further include various projections 320 extending from the fingers 310, and each projection 320 includes an opening. As described below, the openings of the projections 320 can be sized, shaped, and positioned to receive pins or other structures extending from the interconnect retainer 202. When these pins or other structures are inserted through the openings of the projections 320, this helps to hold the fingers 310 of the conductive interconnect layer 206 at desired locations on the interconnect retainer 202.

In addition, various ones of the conductive structures 302-308 shown in FIGS. 3A and 3B may include conductive tabs 322, which represent locations where one of the sensor assemblies 120a-120b can be coupled to the conductive structures 302-308. Each conductive tab 322 therefore allows the associated sensor assembly 120a-120b to capture voltage measurements at the location of the conductive tab 322 within the conductive interconnect layer 206. Each conductive tab 322 may be formed from any suitable conductive material, such as aluminum or copper, and in any suitable manner. Note that the number and positions of the conductive tabs 322 shown here are for illustration only and that any number of conductive tabs 322 may be used at one or more suitable locations within the interconnect assembly 100.

Figure 5A:
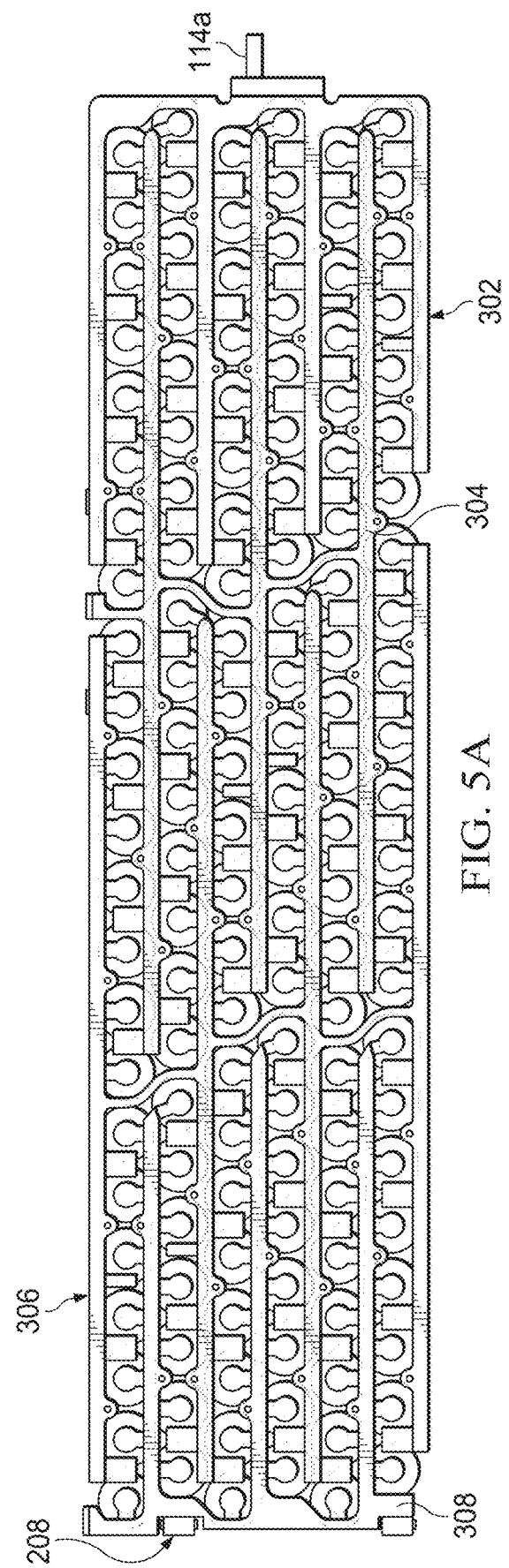
FIGS. 5A through 5D illustrate example connections formed by a conductive interconnect layer in a first sub-module of an interconnect assembly according to this disclosure.

The specific arrangement of interconnects 312-316 here supports the creation of specific series and parallel paths through the batteries 104. FIGS. 5A through 5D illustrate example connections formed by a conductive interconnect layer 206 in a first sub-module 102a of an interconnect assembly 100 according to this disclosure. In FIG. 5A, all four conductive structures 302-308 are shown as being coupled to one hundred and thirty eight batteries 104 in the "3S46P" configuration. As noted above, this configuration means that each sub-module 102a-102b includes three series-coupled collections of forty six batteries 104 coupled in parallel, although other numbers of batteries 104 in series and in parallel may be used as needed or desired.

Figure 5B:
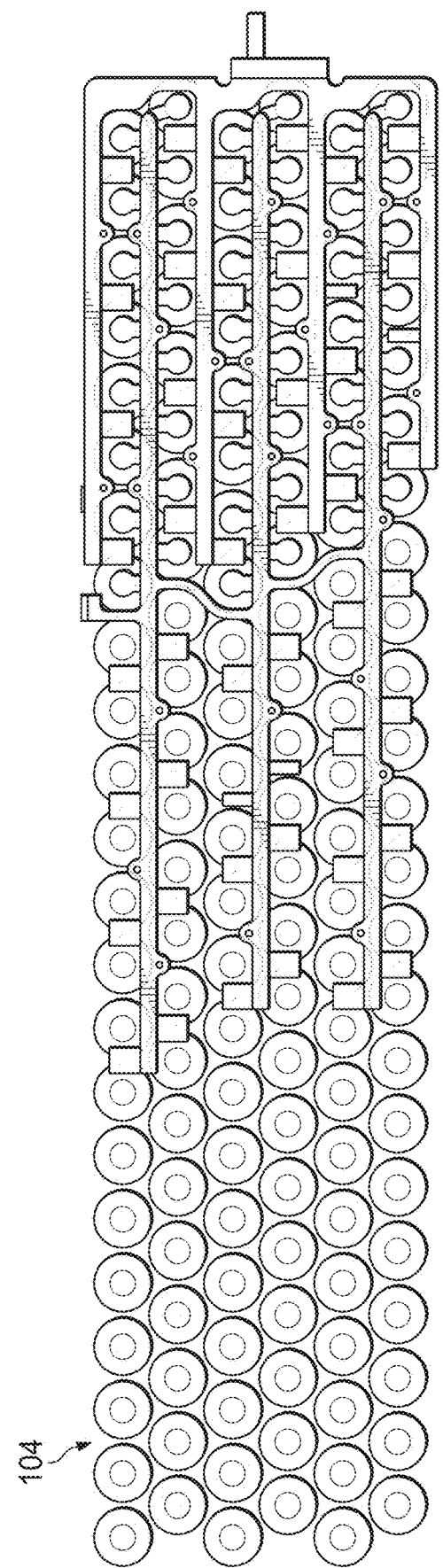

In FIG. 5B, the first collection of batteries 104 coupled in parallel is shown. Here, the conductive structure 302 is coupled to the anodes 404 of the batteries 104 using single-anode and double-anode interconnects 314 and 316. The conductive structure 304 is coupled to the cathodes 402 of the same batteries 104 using cathode interconnects 312. With these connections, the batteries 104 in the first collection are coupled in parallel with one another.

Figure 5C:
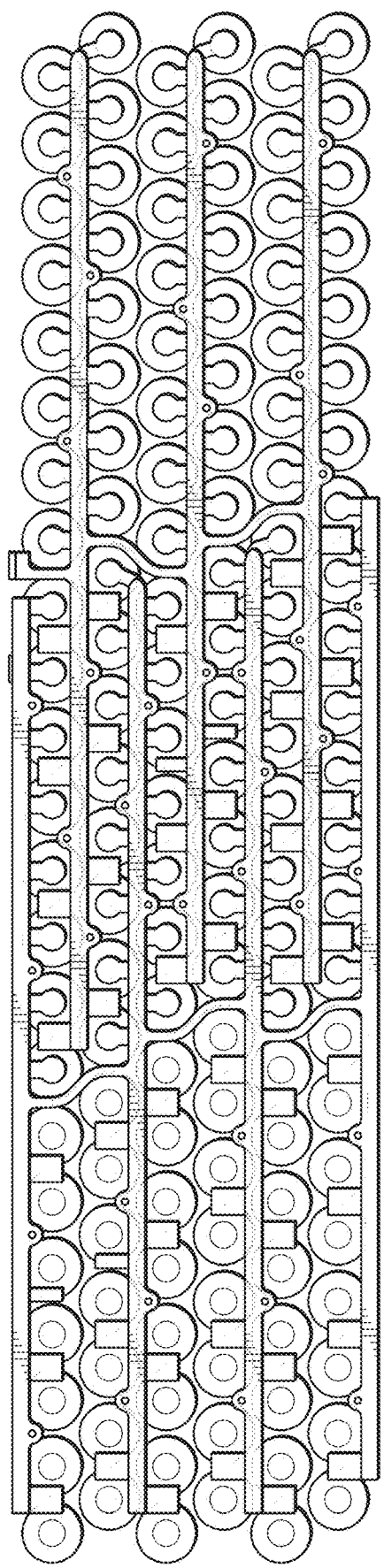

In FIG. 5C, the second collection of batteries 104 coupled in parallel is shown. Here, the conductive structure 304 is coupled to the anodes 404 of the batteries 104 using single-anode and double-anode interconnects 314 and 316. The conductive structure 306 is coupled to the cathodes 402 of the same batteries 104 using cathode interconnects 312. With these connections, the batteries 104 in the second collection are coupled in parallel with one another. Also, the second collection of batteries 104 is coupled in series with the first collection of batteries 104.

Figure 5D:
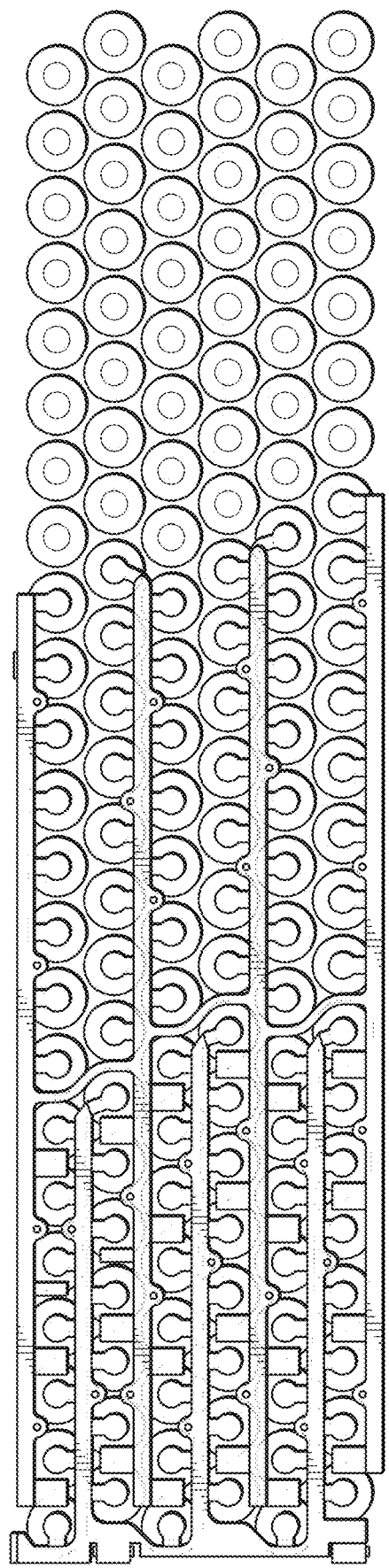

In FIG. 5D, the third collection of batteries 104 coupled in parallel is shown. Here, the conductive structure 306 is coupled to the anodes 404 of the batteries 104 using single-anode and double-anode interconnects 314 and 316. The conductive structure 308 is coupled to the cathodes 402 of the same batteries 104 using cathode interconnects 312. With these connections, the batteries 104 in the third collection are coupled in parallel with one another. Also, the third collection of batteries 104 is coupled in series with the first and second collections of batteries 104.

Figure 6:
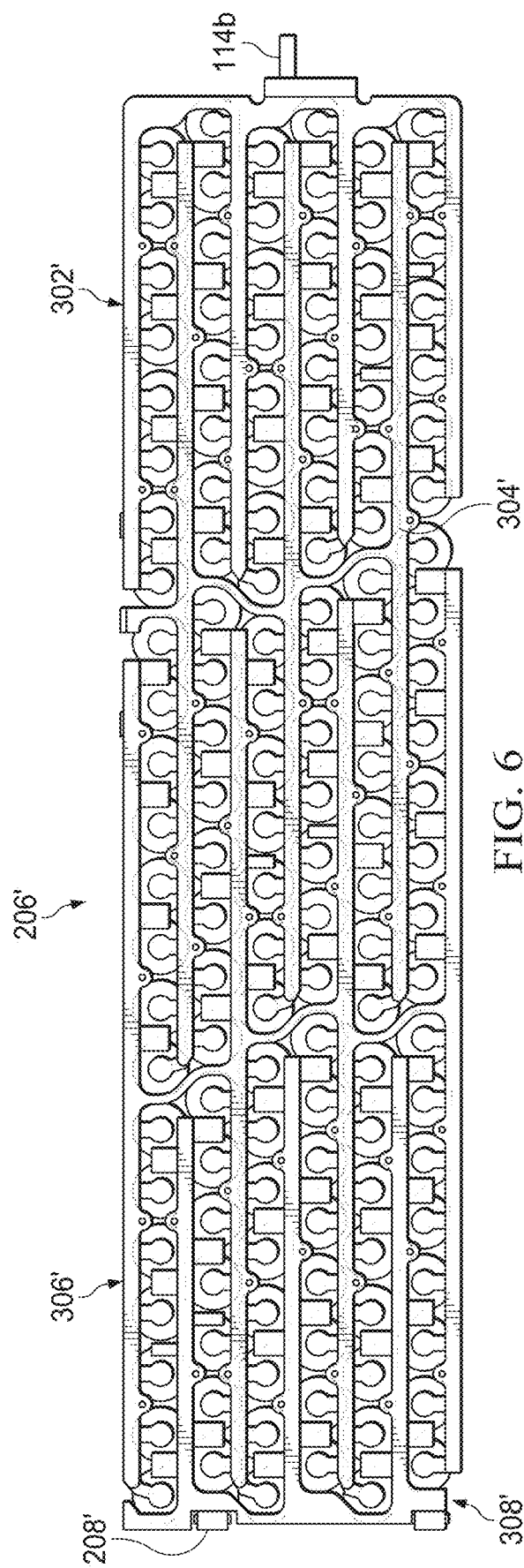
FIG. 6 illustrates example connections formed by a conductive interconnect layer in a second sub-module of an interconnect assembly according to this disclosure.
Figure 7A:
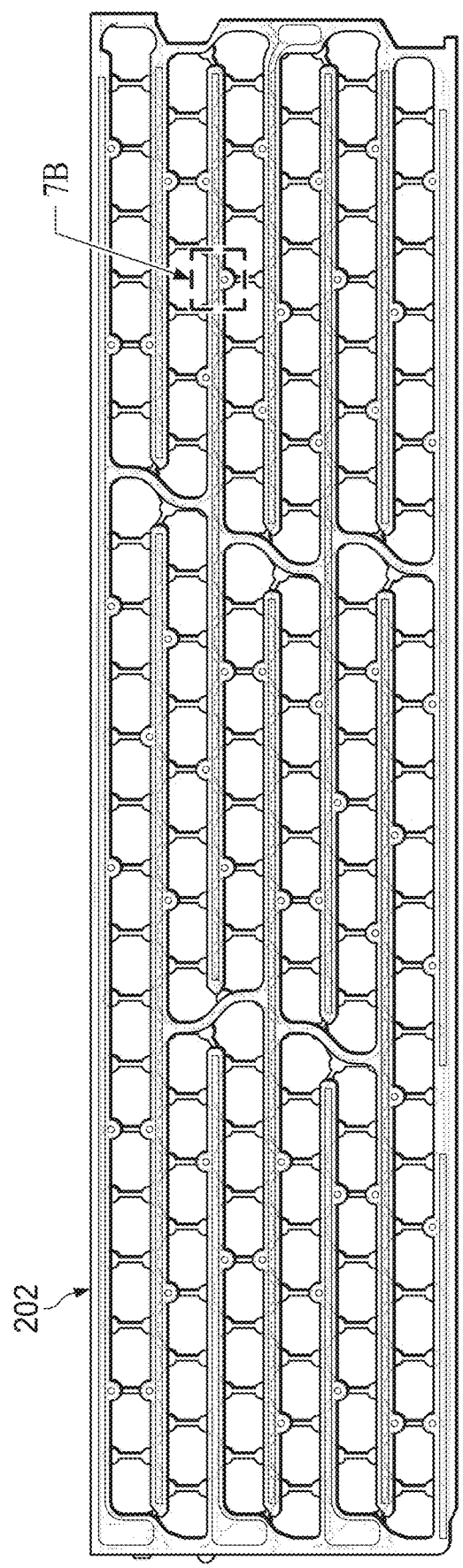
FIGS. 7A through 7D illustrate an example mechanism for securing a conductive interconnect layer to an interconnect retainer in an interconnect assembly according to this disclosure.
Figure 7B:
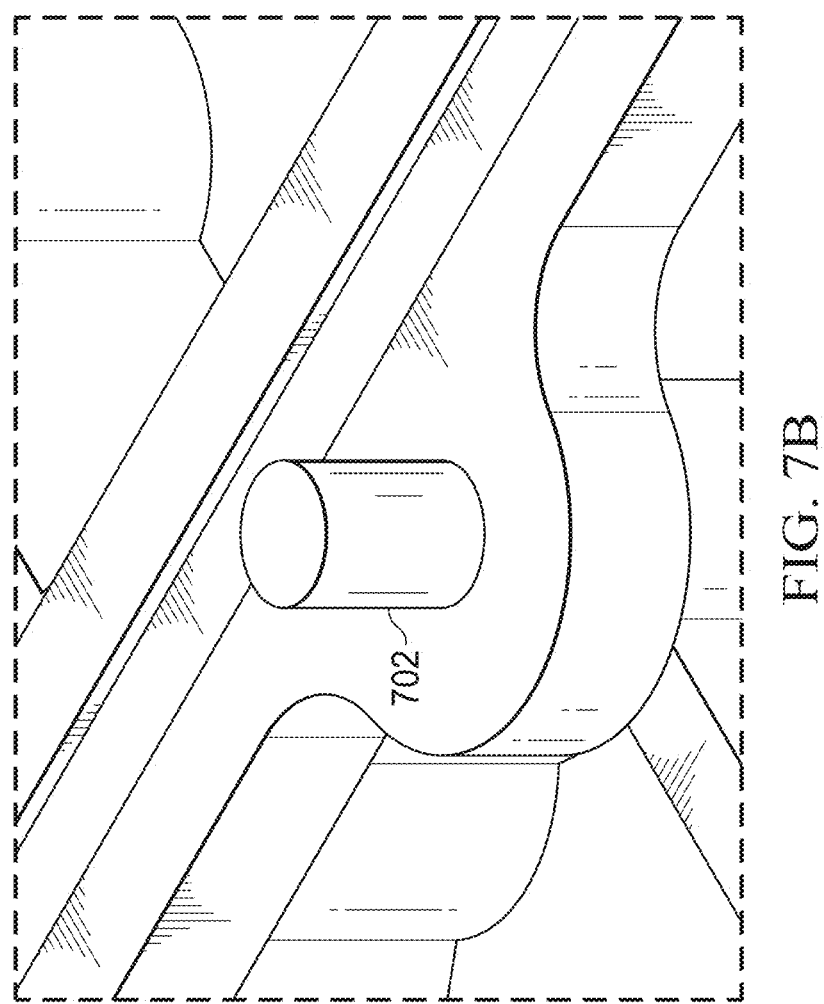
Figure 7C:
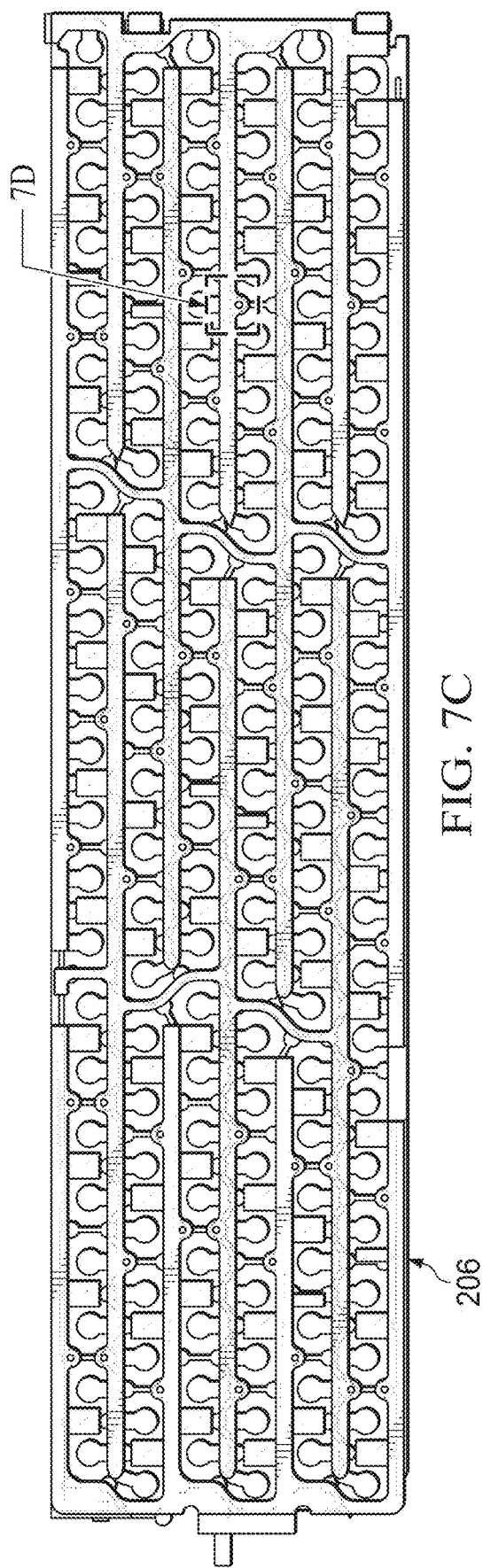
Figure 7D:
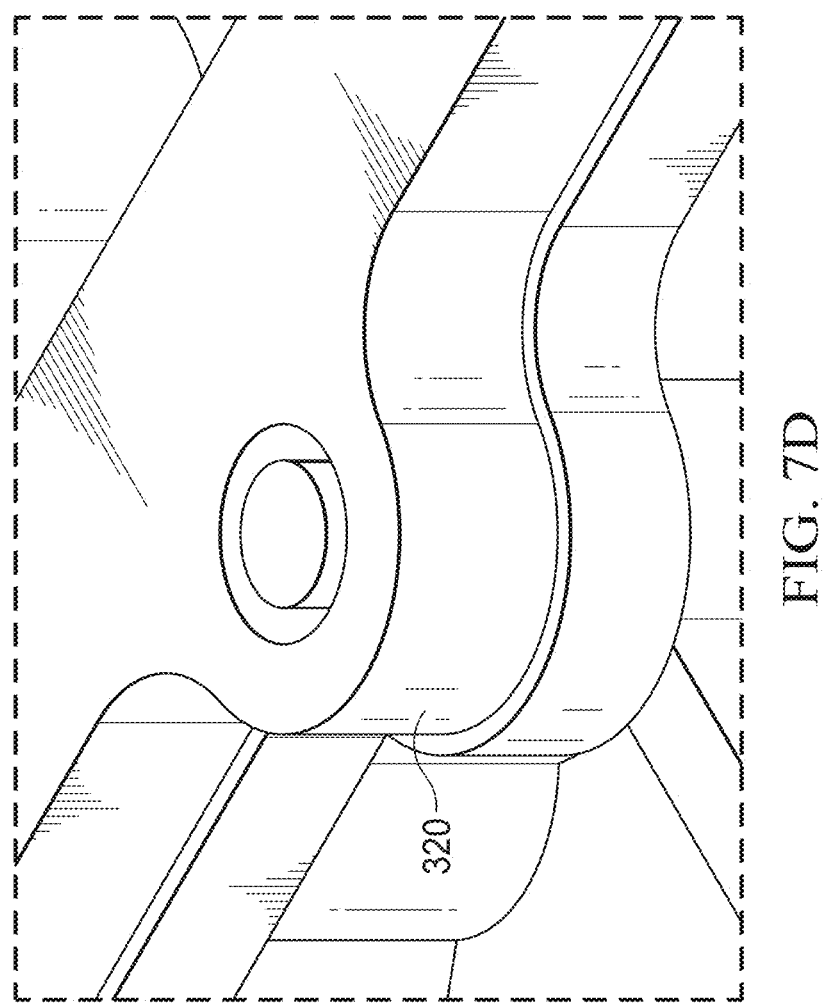

As discussed above, the sub-module 102b may include similar components as the sub-module 102a, but the polarities of the connections to the batteries 104 in the sub-module 102b can be reversed. FIG. 6 illustrates example connections formed by a conductive interconnect layer 206' in a second sub-module 102b of an interconnect assembly 100 according to this disclosure. In this example, the conductive interconnect layer 206' in the second sub-module 102b is formed using four distinct conductive structures 302'-308', which are similar to the conductive structures 302-308 described above (except positive connections to batteries 104 have been replaced with negative connections to batteries 104 and vice versa). This helps to provide the proper voltage change from the terminal connector 114b to conductive forks 208' of the sub-module 102b and the proper voltage change from the conductive forks 208 of the sub-module 102a to the terminal connector 114a.

As can be seen in FIGS. 3A through 6, the conductive interconnect layers 206 and 206' of the interconnect assembly 100 allow for desired series and parallel connections to be formed with batteries 104 in both sub-modules 102a-102b. Because of this, the batteries 104 can be used to provide a desired amount of electrical power to an electric vehicle or other powered system. In other words, the conductive interconnect layers 206 and 206' of the interconnect assembly 100 can be used to clearly define a circuit that provides a desired amount of electrical power.

Although FIGS. 3A through 6 illustrate example conductive interconnect layers 206 and 206' of sub-modules 102a-102b in an interconnect assembly 100, various changes may be made to FIGS. 3A through 6. For example, the conductive interconnect layers 206 and 206' can vary based on the number and arrangement of batteries being used. As a particular example, one of the conductive structures 304, 306 and one of the conductive structures 304', 306' may be omitted if each sub-module 102a-102b includes two collections of batteries in series. As another particular example, additional series connection structures may be used if each sub-module 102a-102b includes more than three collections of batteries in series. Also, the use of single-cathode, single-anode, and double-anode interconnects 312-316 is for illustration only, and each interconnect 312-316 may have any desired form.

FIGS. 7A through 7D illustrate an example mechanism for securing a conductive interconnect layer 206 to an interconnect retainer 202 in an interconnect assembly 100 according to this disclosure. While the mechanism here is described as being used in the sub-module 102a, the same type of mechanism may be used in the sub-module 102b (although different sub-modules may use different mechanisms if needed or desired).

As noted above, the conductive structures 302-308 forming the conductive interconnect layer 206 may include projections 320 with openings. As shown in FIGS. 7A through 7D, the interconnect retainer 202 includes various pins 702 projecting from a surface of the interconnect retainer 202. At least portions of the pins 702 can fit through the corresponding openings of the projections 320. In some cases, the pins 702 can fit snugly or tightly into the openings of the projections 320, which helps to hold the conductive structures 302-308 forming the conductive interconnect layer 206 in place on the interconnect retainer 202.

Among other things, this can help to hold the various interconnects 312-316 of the conductive interconnect layer 206 at suitable locations for laser welding or otherwise during coupling of the interconnects 312-316 to the batteries 104. This can also help to reduce or prevent one of the conductive structures 302-308 from contacting another of the conductive structures 302-308 and creating a short circuit. In addition, because the conductive structures 302-308 forming the conductive interconnect layer 206 can be held in place, there may be less restrictive tolerances placed on the manufacture of the conductive structures 302-308, which can help to simplify construction and reduce costs of the interconnect assembly 100.

Although FIGS. 7A through 7D illustrate one example of a mechanism for securing a conductive interconnect layer 206 to an interconnect retainer 202 in an interconnect assembly 100, various changes may be made to FIGS. 7A through 7D. For example, any other suitable mechanism may be used to secure the conductive interconnect layer 206 to the interconnect retainer 202.

FIGS. 8A through 8F illustrate an example mechanism for electrically isolating a conductive interconnect layer 206 from batteries 104 (except through defined interconnects 312-316) according to this disclosure. While the mechanism here is described as being used in the sub-module 102*a*, the same type of mechanism may be used in the sub-module 102*b* (although different sub-modules may use different mechanisms if needed or desired).

Figure 8A:
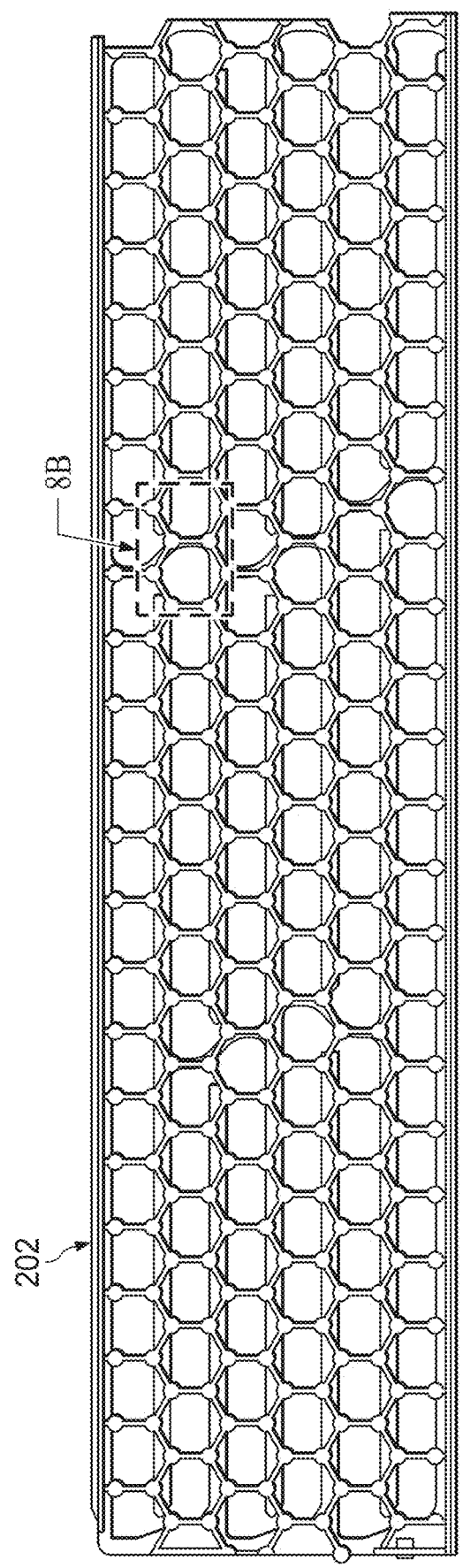
FIGS. 8A through 8F illustrate an example mechanism for electrically isolating a conductive interconnect layer from batteries (except through defined interconnects) according to this disclosure.
Figure 8B:
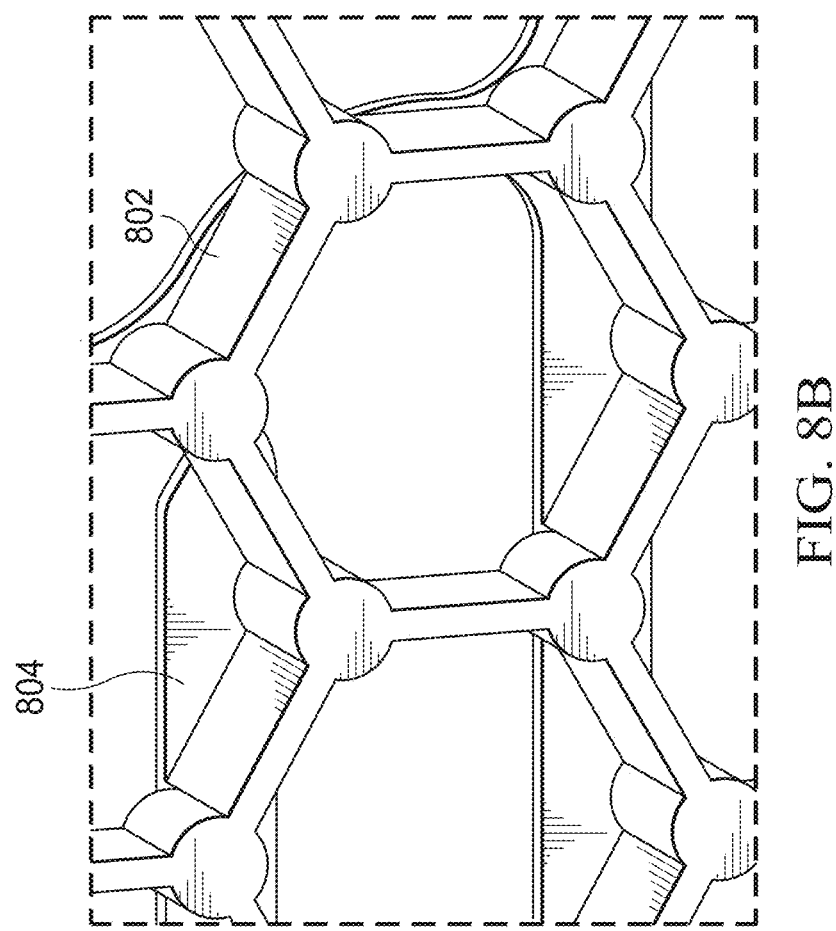
Figure 8C:
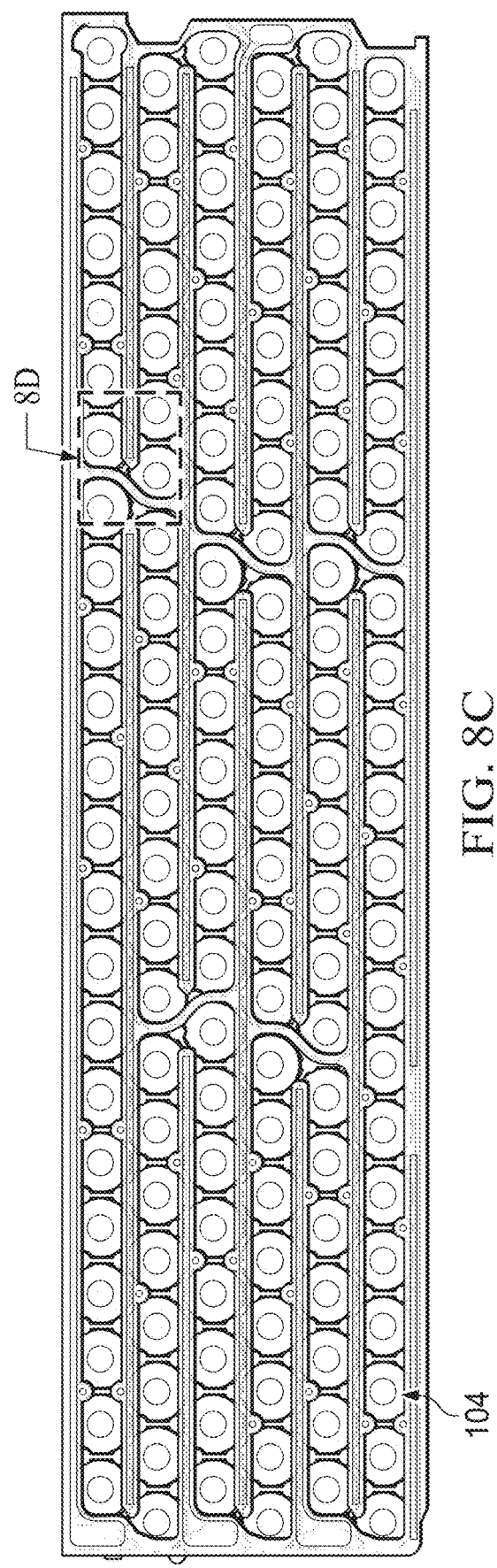

As shown in FIGS. 8A and 8B, the interconnect retainer 202 includes a number of hexagonal, honeycomb, or other structures 802. Each structure 802 is configured to receive a portion of a battery 104. The walls of the structures 802 can be used to contact the sides or tops of the batteries 104 in order to help retain and reduce or prevent movement of the batteries 104 within the interconnect assembly 100.

As shown in FIGS. 8A through 8F, flanges 804 with recesses or grooves 806 are positioned above the structures 802. The flanges 804 can be defined in areas where the fingers 310 of the conductive interconnect layer 206 will be positioned. The recesses or grooves 806 are configured to receive the adhesive layer 204, and the conductive interconnect layer 206 is mounted to the interconnect retainer 202 using the adhesive layer 204.

Figure 8D:
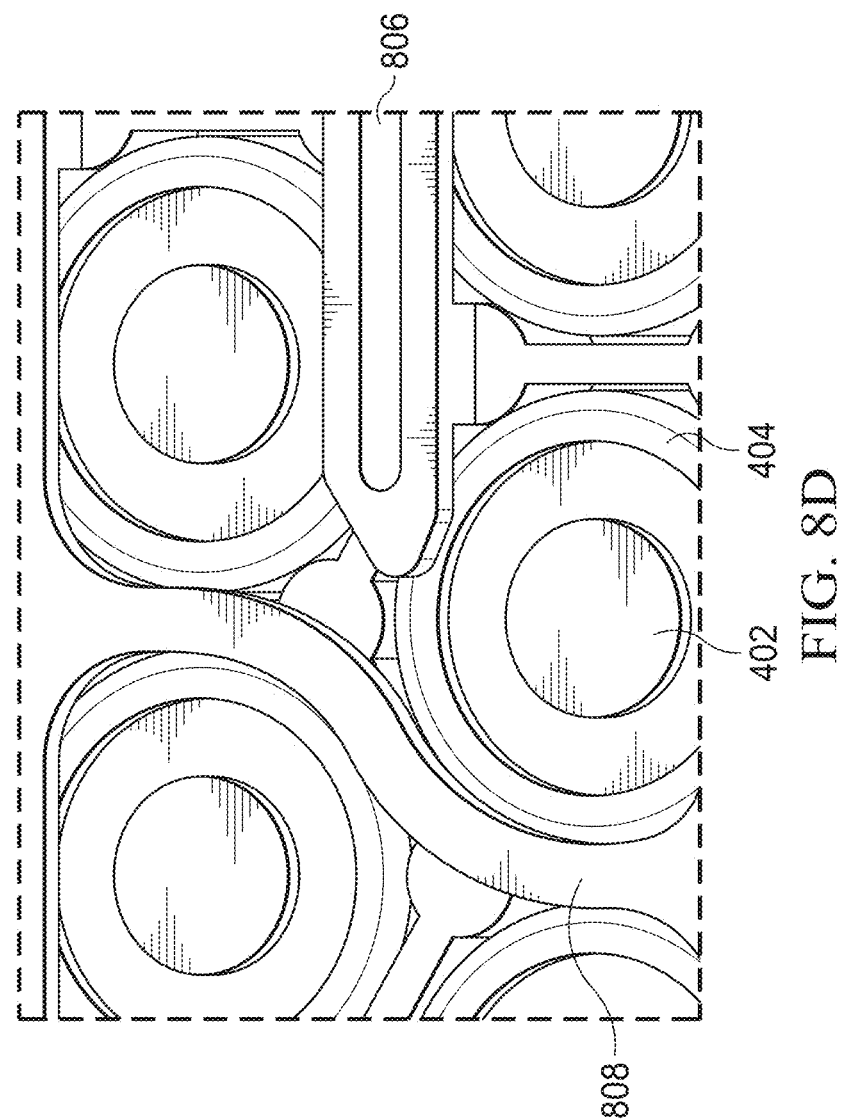
Figure 8E:
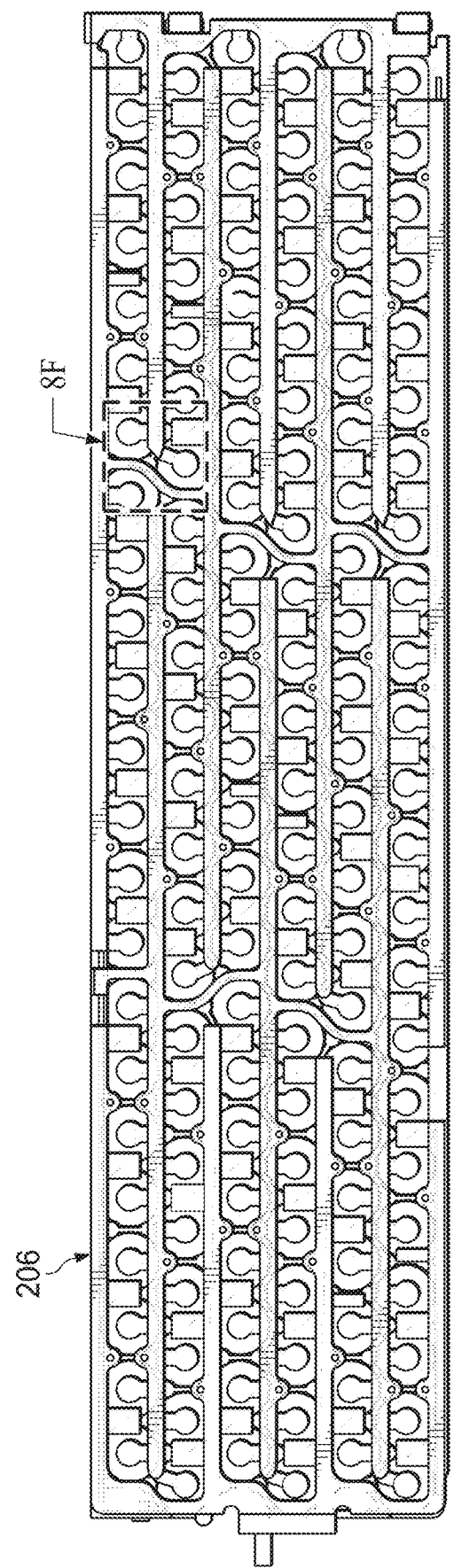
Figure 8F:
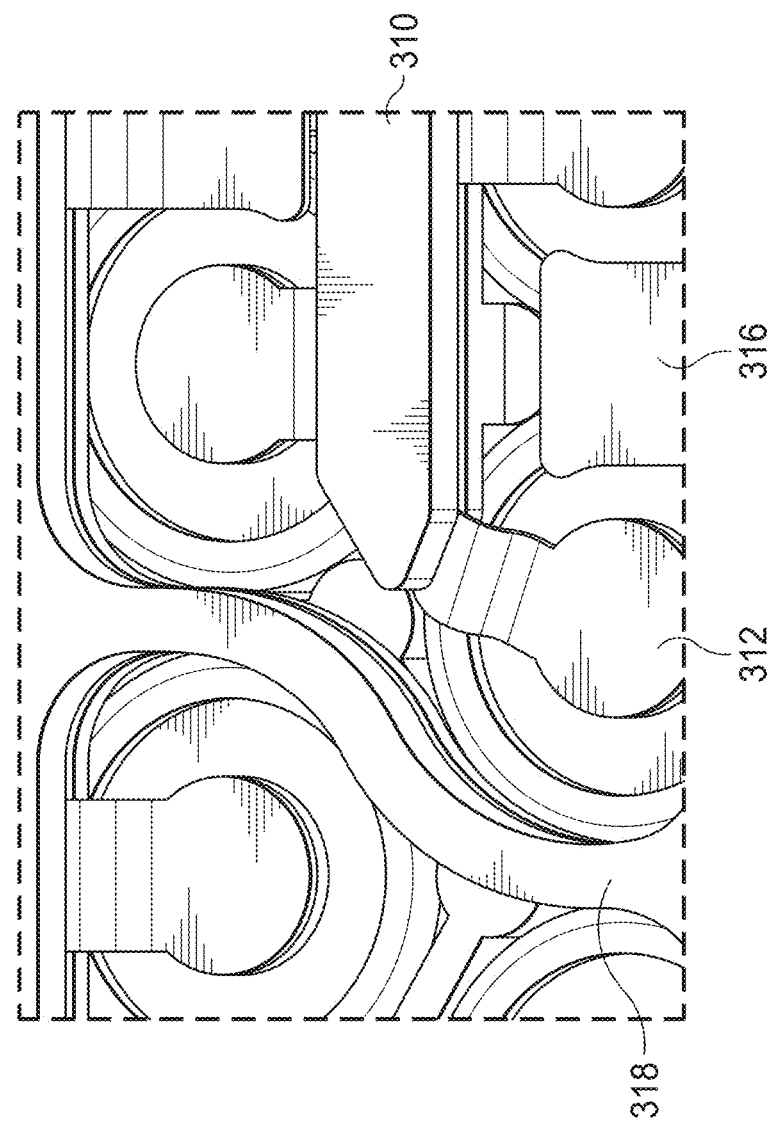

The flanges 804 help to hold the conductive interconnect layer 206 above the batteries 104 so that the conductive interconnect layer 206 does not form undesired electrical connections to the batteries 104. Instead, electrical connections between the fingers 310 and the batteries 104 are formed using the interconnects 312-316, which extend from the fingers 310 to the batteries 104. As can be seen in FIG. 8D, the flanges 804 may cover portions of the anodes 404 of various batteries 104, which again can help to avoid undesired electrical connections to the batteries 104.

In this example, the interconnect retainer 202 can also include raised paths 808 that correspond to locations of the balancing conductors 318 of the conductive interconnect layer 206. Again, the paths 808 can help to separate the balancing conductors 318 from the batteries 104. As a result, the interconnect retainer 202 can provide relatively large barriers between the conductive interconnect layer 206 and the batteries 104.

Although FIGS. 8A through 8F illustrate one example of a mechanism for electrically isolating a conductive interconnect layer 206 from batteries 104 (except through defined interconnects 312-316), various changes may be made to FIGS. 8A through 8F. For example, the structures 802 of the interconnect retainer 202 may have one or more shapes other than hexagonal or honeycomb.

Figure 9:
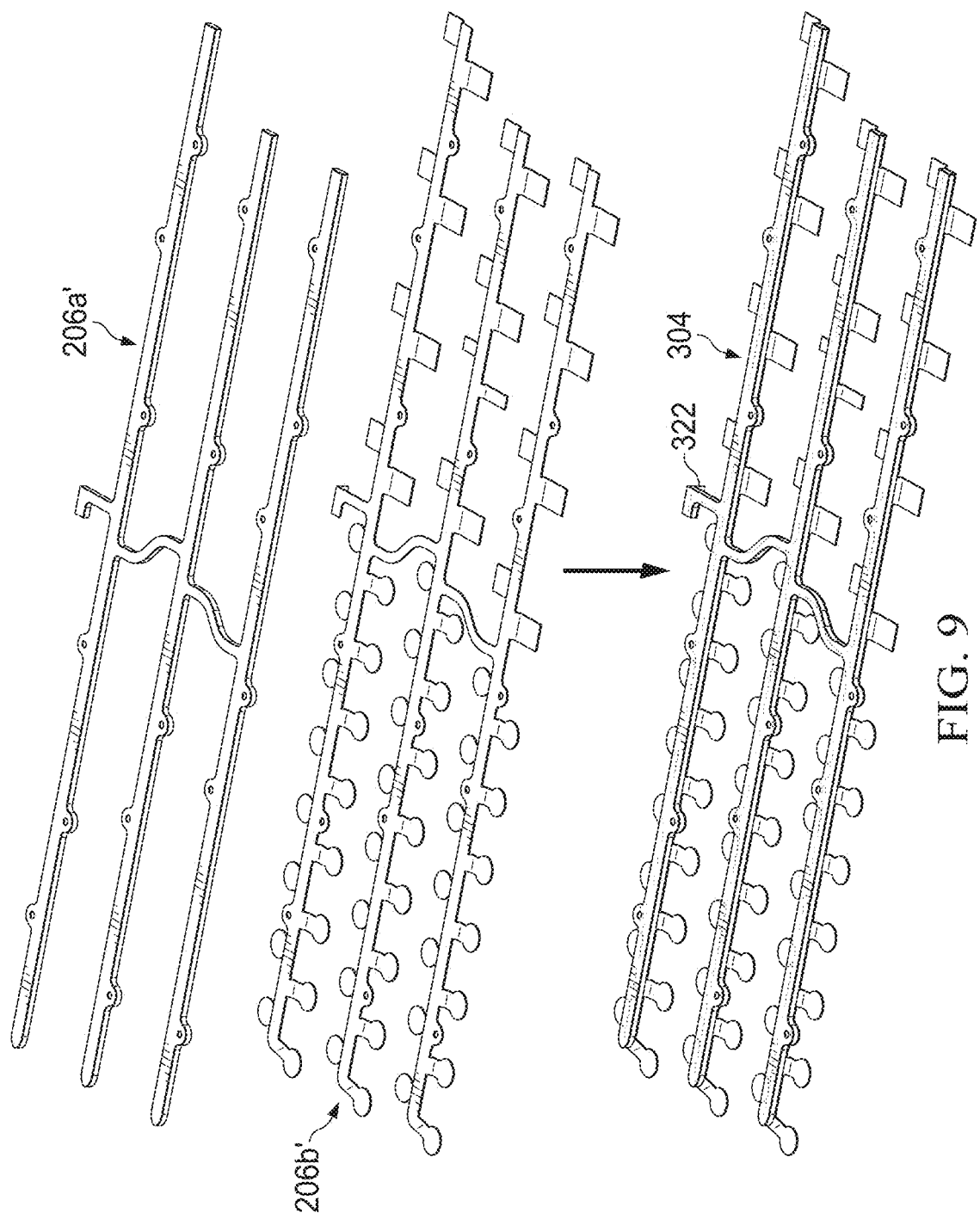
FIG. 9 illustrates an example technique for forming a conductive interconnect layer of an interconnect assembly according to this disclosure.

FIG. 9 illustrates an example technique for forming a conductive interconnect layer 206 of an interconnect assembly 100 according to this disclosure. While the technique here is described as being used to form the conductive interconnect layer 206, the same type of technique may be used to form the conductive interconnect layer 206' (although different techniques may be used if needed or desired).

As shown in FIG. 9, two layers 206*a*'-206*b*' represent portions of the layers 206*a*-206*b* described above. In this example, the layers 206*a*'-206*b*' are used to form the conductive structure 304. Here, the layers 206*a*'-206*b*' can be welded or otherwise connected to one another in order to form the conductive structure 304, which represents part of the conductive interconnect layer 206. The same approach can be used to connect other portions of the layers 206*a*-206*b* to form the other conductive structures 302, 306, 308 of the conductive interconnect layer 206.

This approach allows parts of the more flexible layer 206*b* to be manipulated and positioned as needed for attachment to the batteries 104 while allowing the thicker layer 206*a* to be more rigid and carry larger electrical currents. As the lengths of the fingers 310 increase in order to couple the fingers 310 to more batteries 104, higher currents would cause the thinner layer 206*b* (by itself) to increase in temperature. Coupling the thinner layer 206*b* to the thicker layer 206*a* helps to reduce the temperature increase in the conductive interconnect layer 206. This may also allow cheaper materials (such as aluminum rather than copper) to be used in the conductive interconnect layer 206. The use of the balancing conductors 318 as described above can also help to distribute electrical currents in the fingers 310 more evenly, which can help to reduce temperature differentials between the fingers 310 in the conductive interconnect layer 206.

Although FIG. 9 illustrates one example of a technique for forming a conductive interconnect layer 206 of an interconnect assembly 100, various changes may be made to FIG. 9. For example, the form of the conductive interconnect layer 206 can vary based on the specific interconnections needed to form specific electrical paths through a specified number of batteries 104.

Figure 10A:
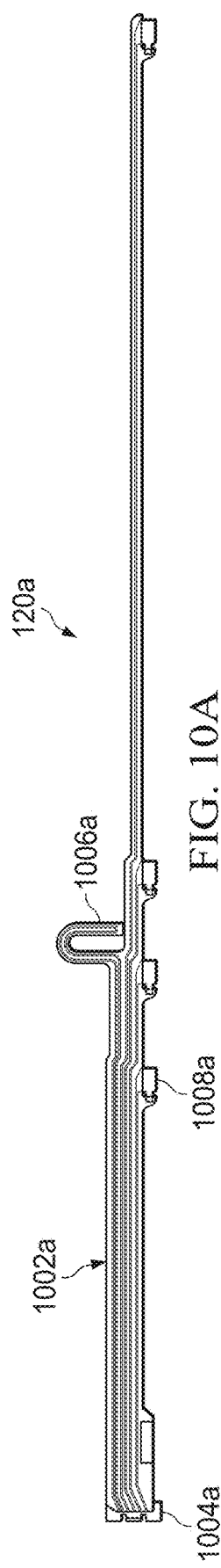
FIGS. 10A and 10B illustrate example sensor assemblies in an interconnect assembly according to this disclosure.
Figure 10B:
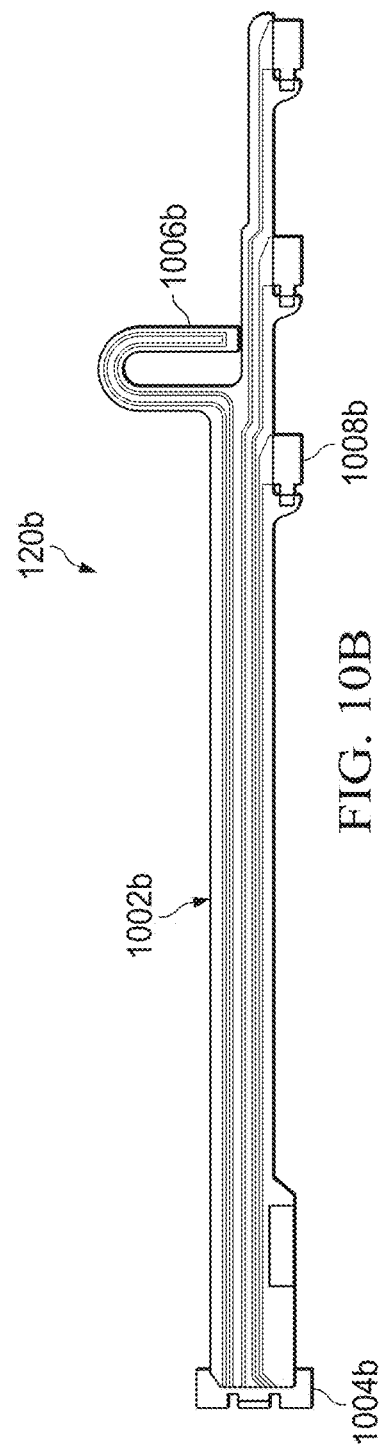

FIGS. 10A and 10B illustrate example sensor assemblies 120*a*-120*b* in an interconnect assembly 100 according to this disclosure. As shown in FIGS. 10A and 10B, each of the sensor assemblies 120*a*-120*b* may respectively include a ribbon cable 1002*a*-1002*b* and a connector 1004*a*-1004*b*. Each ribbon cable 1002*a*-1002*b* represents a flat structure that can carry wires and other components of the sensor assembly 120*a*-120*b*. Each connector 1004*a*-1004*b* represents an electrical interface between the sensor assembly 120*a*-120*b* and the control board 118 or other device.

Each ribbon cable 1002*a*-1002*b* is respectively coupled to a thermistor 1006*a*-1006*b*, which represents a resistor having a resistance that varies with temperature. Each thermistor 1006*a*-1006*b* may be physically attached to the side of a battery 104, conductive finger 310, or other component in a sub-module 102*a*-102*b* in order to sense the temperature of that battery 104, finger 310, or other component. Each ribbon cable 1002*a*-1002*b* is also respectively coupled to multiple voltage contact points 1008*a*-1008*b*, which represent double-sided exposed copper traces or other conductive structures that can be bonded or otherwise attached to various conductive tabs 322. Thus, the ribbon cable 1002*a*-1002*b* can be used to transport electrical signals between the control board 118 and the thermistor 1006*a*-1006*b*/contact points 1008*a*-1008*b*, which allows the control board 118 to obtain temperature and voltage measurements associated with the batteries 104.

In this example, the sensor assembly 120*a* includes a longer ribbon cable 1002*a* and one additional voltage contact point 1008*a* relative to the sensor assembly 120*b*. This is because the sensor assembly 120*a* may be used to measure the voltage at the end of the sub-module 102*a* having the conductive forks 208. Because the sub-modules 102*a*-102*b* are coupled together via the conductive forks 208 and 208', voltage measurements around the conductive forks 208 should be substantially equal to voltage measurements around the conductive forks 208' (with only very minor resistive losses or other losses expected). As a result, the sensor assembly 120*b* does not need to include a longer ribbon cable 1002*b* and an additional contact point 1008*b* to measure the voltage at the end of the sub-module 102*b* having the conductive forks 208'. This can help to reduce the cost of the sensor assembly 120*b* and reduce the number of sensor measurements to be processed. However, nothing prevents the sensor assembly 120*b* from matching the design of the sensor assembly 120*a*.

In some embodiments, each sensor assembly 120*a*-120*b* may be fabricated as a flexible printed circuit (FPC). The flat profiles of the flexible printed circuits, as well as the micron-scale thickness of their materials, add little mass to the overall assembly and provide versatility for packaging. Also, the flexibility of this design allows the portion of each sensor assembly 120*a*-120*b* containing the thermistor 1006*a*-1006*b* to be bent downward and make contact directly with an outer surface of a battery 104. To help ensure that each thermistor 1006*a*-1006*b* stays in place on a battery 104, a pressure-sensitive adhesive or other adhesive can be installed on a cover layer of a flexible printed circuit opposite the thermistor 1006*a*-1006*b*. The relatively thin thicknesses of the various components of the sensor assembly 120*a*-120*b* helps to ensure that there is a very small thermal resistance between the battery 104 on which the thermistor 1006*a*-1006*b* is mounted and the thermistor 1006*a*-1006*b* itself. This can enable a very fast response time for the thermistor 1006*a*-1006*b*. To help ensure that the adhesive retains its cleanliness, a silicone backing or other protector can be applied on the adhesive and removed right before installation of the thermistor 1006*a*-1006*b* onto a battery 104.

Although FIGS. 10A and 10B illustrate examples of sensor assemblies 120*a*-120*b* in an interconnect assembly 100, various changes may be made to FIGS. 10A and 10B. For example, each sensor assembly 120*a*-120*b* may include any desired number of thermistors and any desired number of voltage contact points. Also, nothing prevents a single sensor assembly that wraps partially or completely around the interconnect assembly 100 from being used.

Figure 11A:
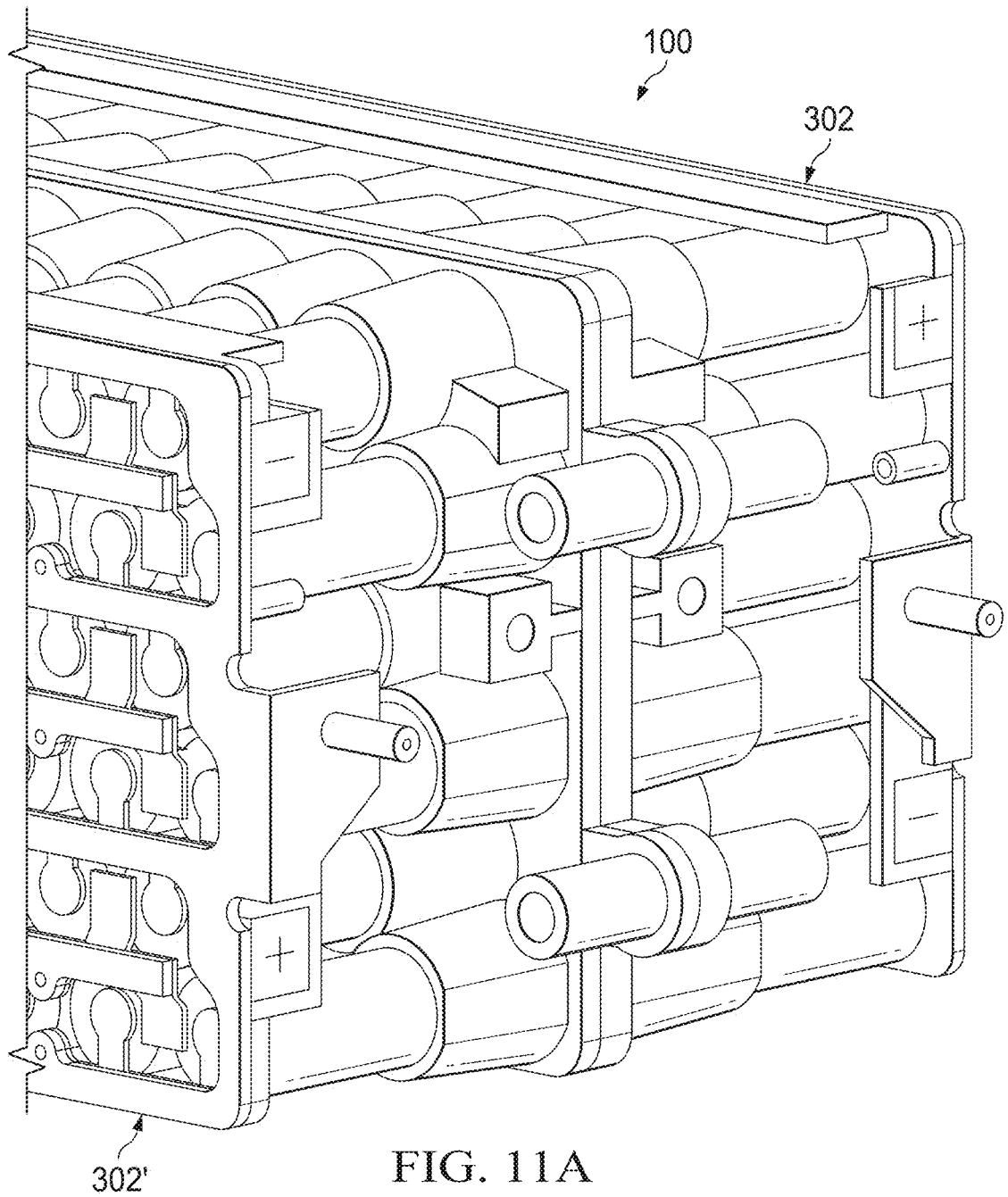
FIGS. 11A and 11B illustrate an example mechanism for coupling an interconnect assembly to a larger system according to this disclosure.
Figure 11B:
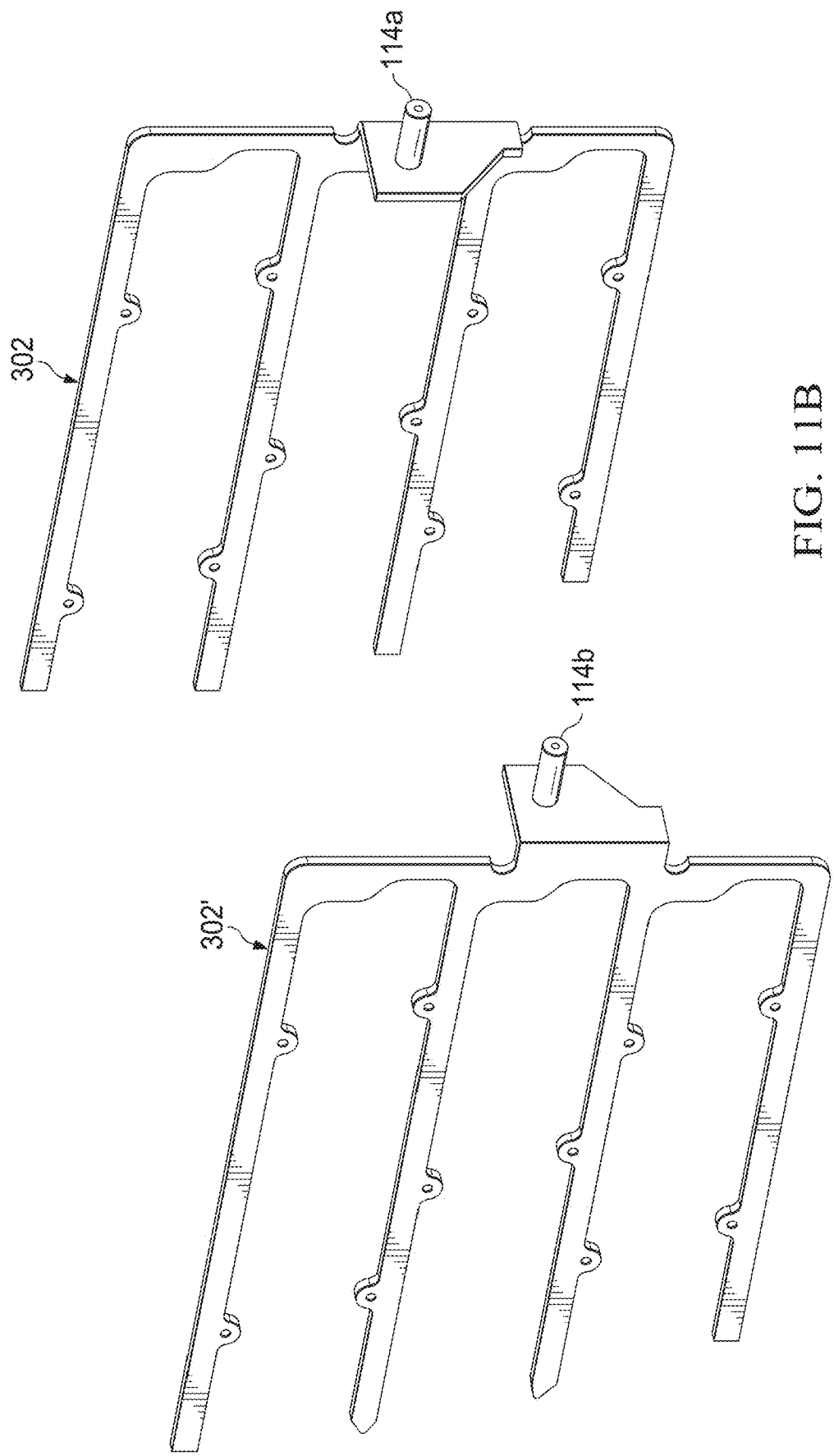

FIGS. 11A and 11B illustrate an example mechanism for coupling an interconnect assembly 100 to a larger system according to this disclosure. As described above, the conductive structures 302 and 302' forming portions of the conductive interconnect layers 206 and 206' in the interconnect assembly 100 include the terminal connectors 114*a*-114*b*. In this design, the terminal connectors 114*a*-114*b* are integrated directly into the conductive interconnect layers 206 and 206' of the interconnect assembly 100. The portions of the conductive structures 302 and 302' coupled to the terminal connectors 114*a*-114*b* can be suitably thick to provide adequate coupling points for external cables or other conductors. Moreover, this approach eliminates the need for any extra parts or assemblies, other than the addition of the posts forming the terminal connectors 114*a*-114*b*. This helps to provide improved flexibility and reduced cost for the interconnect assembly 100.

Figure 12A:
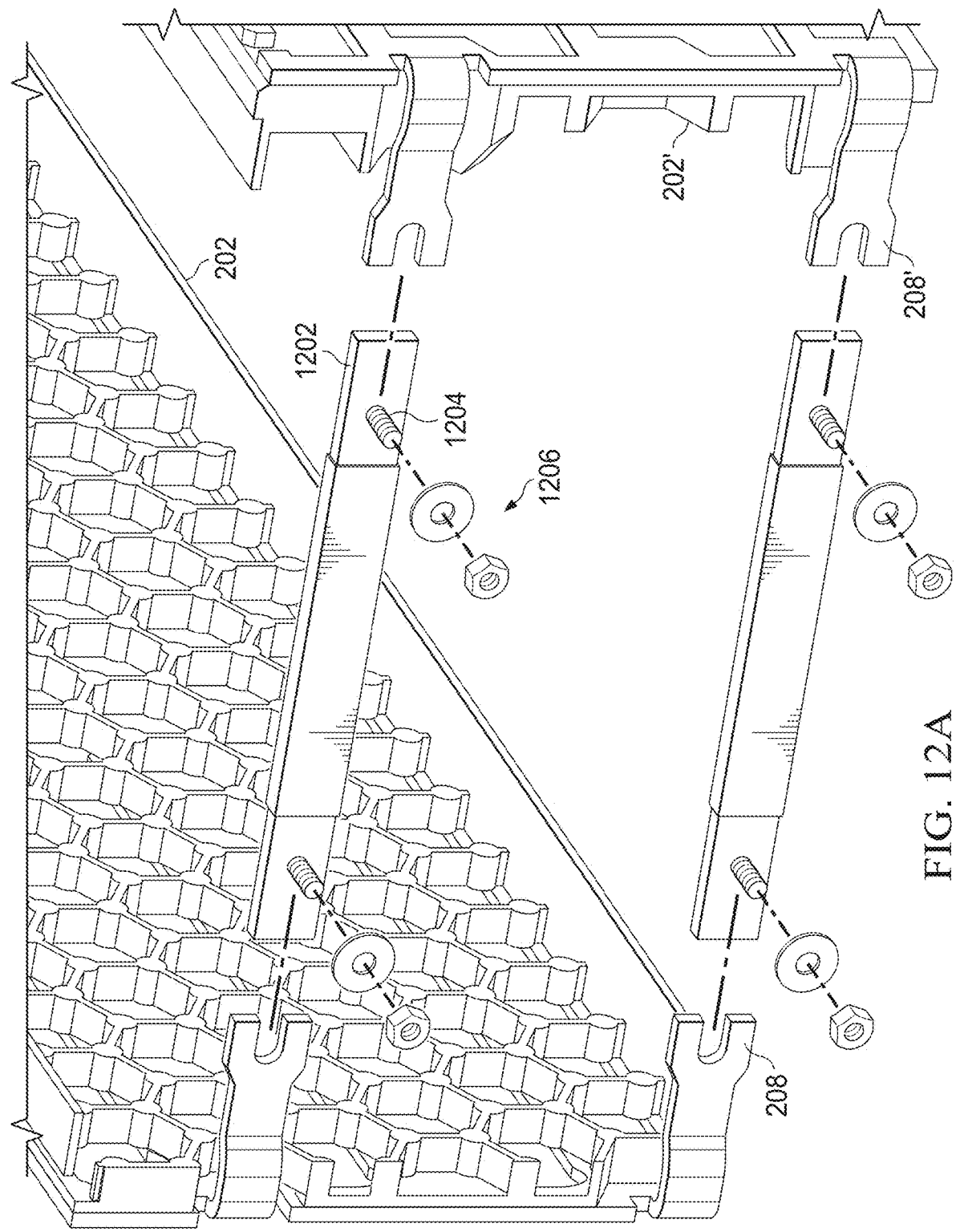
FIGS. 12A and 12B illustrate an example mechanism for electrically coupling sub-modules of an interconnect assembly according to this disclosure.
Figure 12B:
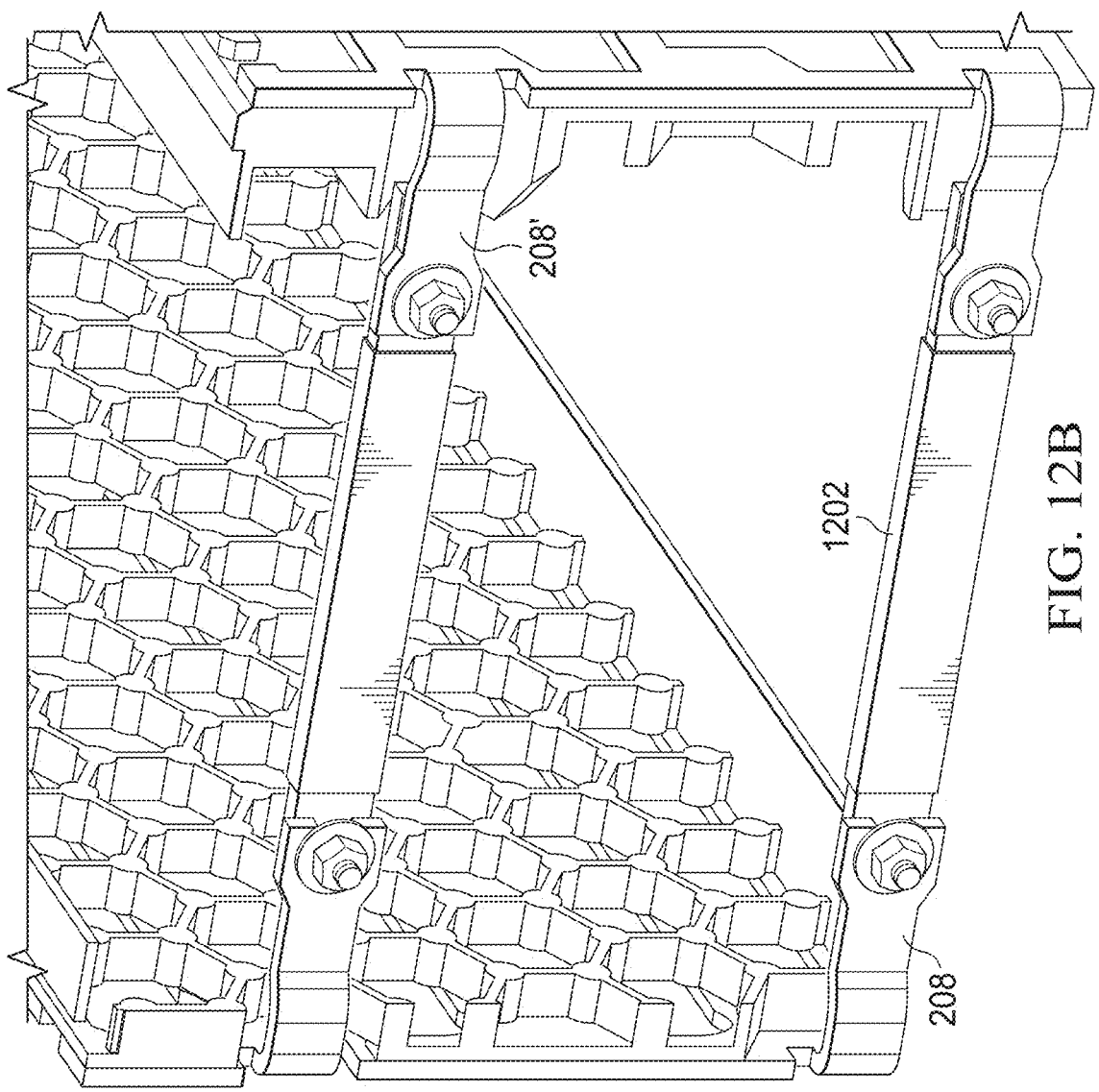

FIGS. 12A and 12B illustrate an example mechanism for electrically coupling sub-modules 102*a*-102*b* of an interconnect assembly 100 according to this disclosure. The mechanism shown here may, for example, be used to electrically couple the conductive forks 208 and 208' of the sub-modules 102*a*-102*b*. As shown in FIGS. 12A and 12B, the conductive forks 208 and 208' of the sub-modules 102*a*-102*b* can be electrically coupled together using multiple busbars 1202. Each busbar 1202 represents an electrically conductive structure that can be attached to the forked ends of the conductive forks 208 and 208'. In this example, each busbar 1202 includes multiple posts 1204, such as threaded studs, which can be inserted into the forked ends of one of the conductive forks 208 and one of the conductive forks 208'. Connectors 1206, such as nuts and washers, can be secured to the posts 1204 in order to couple the busbars 1202 to the conductive forks 208 and 208'. Once secured, the busbars 1202 can be used to transport electrical currents between the conductive forks 208 and 208' of the sub-modules 102*a*-102*b*. An interconnect retainer 202' is also shown here, which represents the interconnect retainer in the sub-module 102*b*.

These approaches can reduce or eliminate the need for metal forming operations to complete the fabrication of the interconnect assembly 100, and these approaches can simplify the equipment used to fabricate the interconnect assembly 100. Also, these approaches can reduce or eliminate the need for complex electrical connectors that would need to be capable of absorbing tolerance stack-up between interconnect assemblies 100 while still providing reliable low-resistance electrical joints. Here, the connectors 1206 can be sized to provide adequate clamping force needed to overcome any preloading that may be introduced from the tolerance stack while still meeting any electrical resistance requirements.

Although FIGS. 11A and 11B illustrate one example of a mechanism for coupling an interconnect assembly 100 to a larger system and FIGS. 12A and 12B illustrate one example of a mechanism for electrically coupling sub-modules 102*a*-102*b* of an interconnect assembly 100, various changes may be made to FIGS. 11A through 12B. For example, while two busbars 1202 are shown here, more busbars 1202 may be used if more batteries 104 are present or if the batteries 104 are arranged differently in the interconnect assembly 100.

Figure 13:
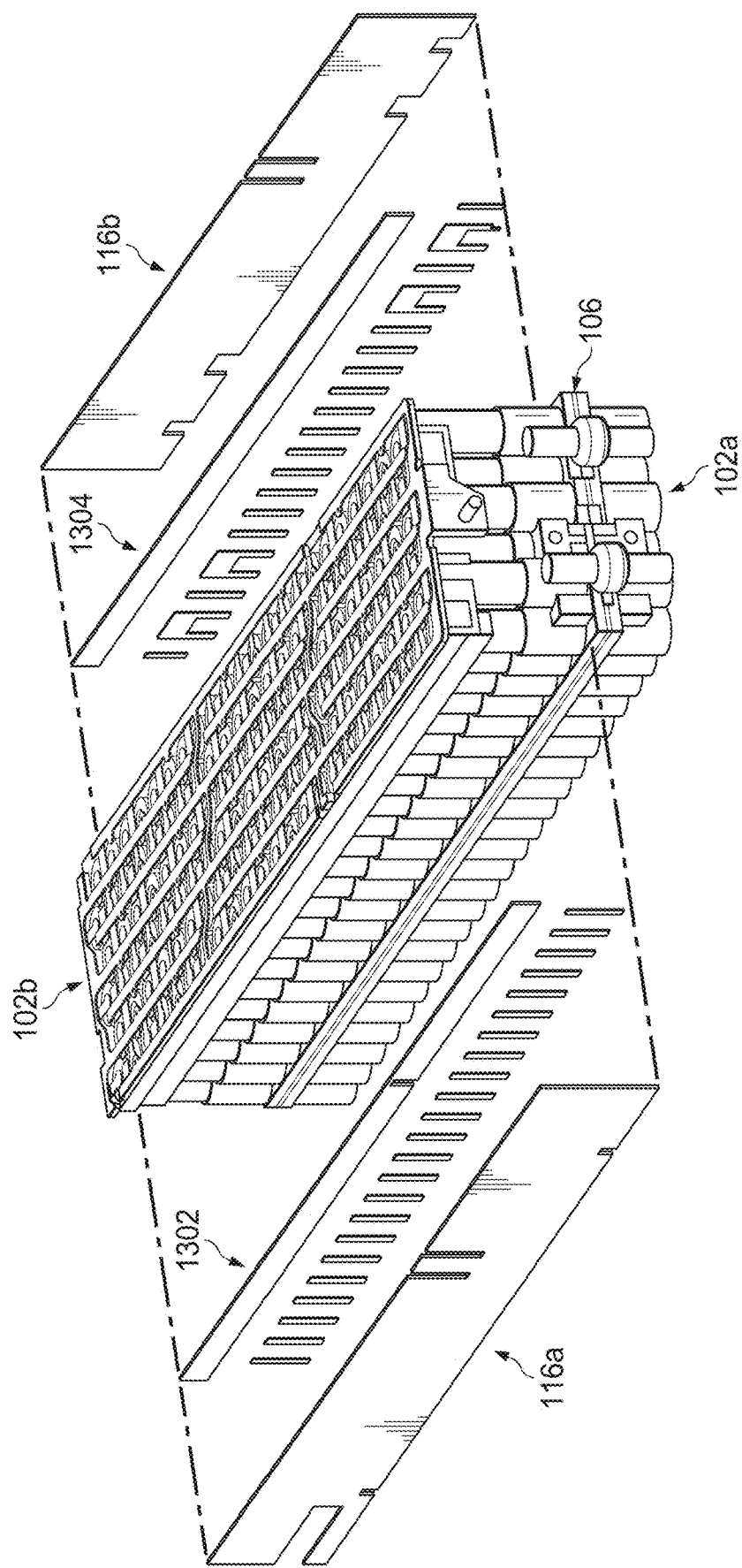
FIG. 13 illustrates an example structural reinforcement for an interconnect assembly according to this disclosure.

FIG. 13 illustrates an example structural reinforcement for an interconnect assembly 100 according to this disclosure. As shown in FIG. 13, a portion of the sub-module 102*a* and the sub-module 102*b* are shown as being coupled together. A stiffening plate 116*a* is secured to one side of the sub-module 102*b* using an adhesive layer 1302, and another stiffening plate 116*b* is secured to the opposite side of the sub-module 102*b* using an adhesive layer 1304. While not shown here, the same approach may be used to couple additional stiffening plates to opposite sides of the sub-module 102*a*. The stiffening plates can link the sub-modules 102*a*-102*b* to the coldplate 106, such as via structural adhesive joints, on either side of the interconnect assembly 100. Moving structural connections to the sides of the interconnect assembly 100 helps to reduce or avoid the need for widening spaces between the batteries 104 to fit structural components. This also reduces the need for precision application of adhesive in the adhesive layers 1302 and 1304 since the adhesive layers 1302 and 1304 are away from critical areas near the tops of the batteries 104.

In addition to the structural reinforcement provided by the stiffening plates, structural reinforcement can be provided by the adhesion of the conductive interconnect layers 206, 206' to the interconnect retainers 202, 202' in the sub-modules 102*a*-102*b*. As shown in FIGS. 8A through 8F and discussed above, the interconnect retainers 202, 202' can include flanges 804 with recesses or grooves 806, which receive adhesive that couples the conductive interconnect layers 206, 206' to the interconnect retainers 202, 202'. This helps to secure the conductive interconnect layers 206, 206' to the interconnect retainers 202, 202' in the sub-modules 102*a*-102*b*. In some cases, the recesses or grooves 806 may be relatively deep (such as about 0.5 millimeters) to capture adhesive and limit unwanted squeeze out of the adhesive. The recesses or grooves 806 also increase the surface area on the interconnect retainers 202, 202' available for bonding with the adhesive.

Although FIG. 13 illustrates one example of a structural reinforcement for an interconnect assembly 100, various changes may be made to FIG. 13. For example, other forms of structural reinforcement may be provided with or used by the interconnect assembly 100.

Figure 14A:
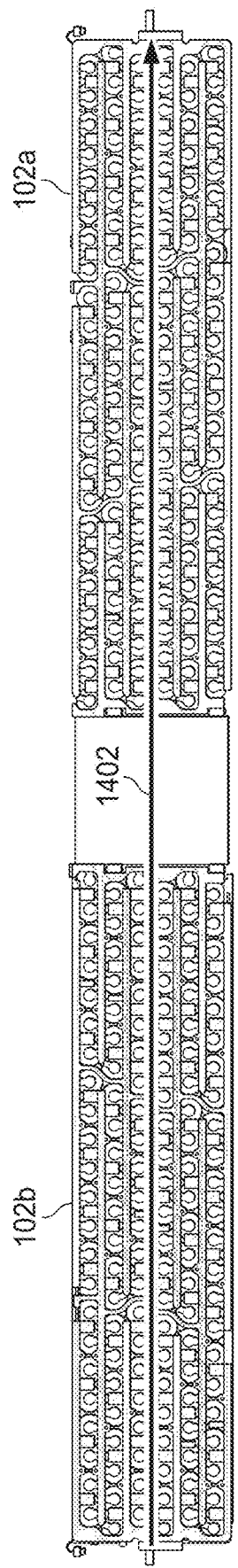
FIGS. 14A and 14B illustrate example current distributions in interconnect assemblies according to this disclosure.
Figure 14B:
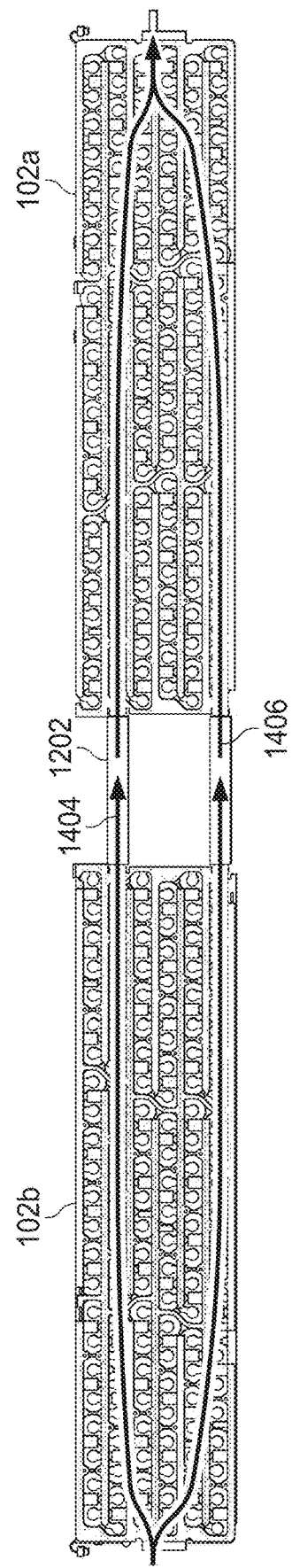

FIGS. 14A and 14B illustrate example current distributions in interconnect assemblies according to this disclosure. As shown in FIG. 14A, it is assumed here that each finger 310 in the conductive structure 308 of the sub-module 102*a* is coupled directly to a corresponding finger 310 in the conductive structure 308' of the sub-module 102*b*. Since electrical current naturally follows the path of least resistance, even though the fingers 310 of the sub-modules 102*a*-102*b* are coupled together, the bulk of an electrical current 1402 will flow directly between the terminal connectors 114*a*-114*b*. As a result, batteries 104 in the central portion of the sub-modules 102*a*-102*b* may be loaded somewhat more than other batteries 104. This can result in higher operating temperatures in these batteries 104, which may limit their power throughput and contribute to advanced cell aging or reduced cycle life.

As shown in FIG. 14B, by using two busbars 1202 and two conductive forks 208, 208' in each sub-module 102*a*-102*b* to couple the sub-modules 102*a*-102*b* together, various electrical currents 1404-1406 will flow more evenly between the terminal connectors 114*a*-114*b* (compared to FIG. 14A). This helps to load-balance the batteries 104 in the interconnect assembly 100 better, which can help to provide more consistent operating temperatures in the batteries 104 and improve power throughput and cell aging/cycle life.

Although FIGS. 14A and 14B illustrate examples of current distributions in interconnect assemblies, various changes may be made to FIGS. 14A and 14B. For example, other current distributions are possible with other arrangements of batteries 104, conductive forks 208, 208', and busbars 1202.

Figure 15A:
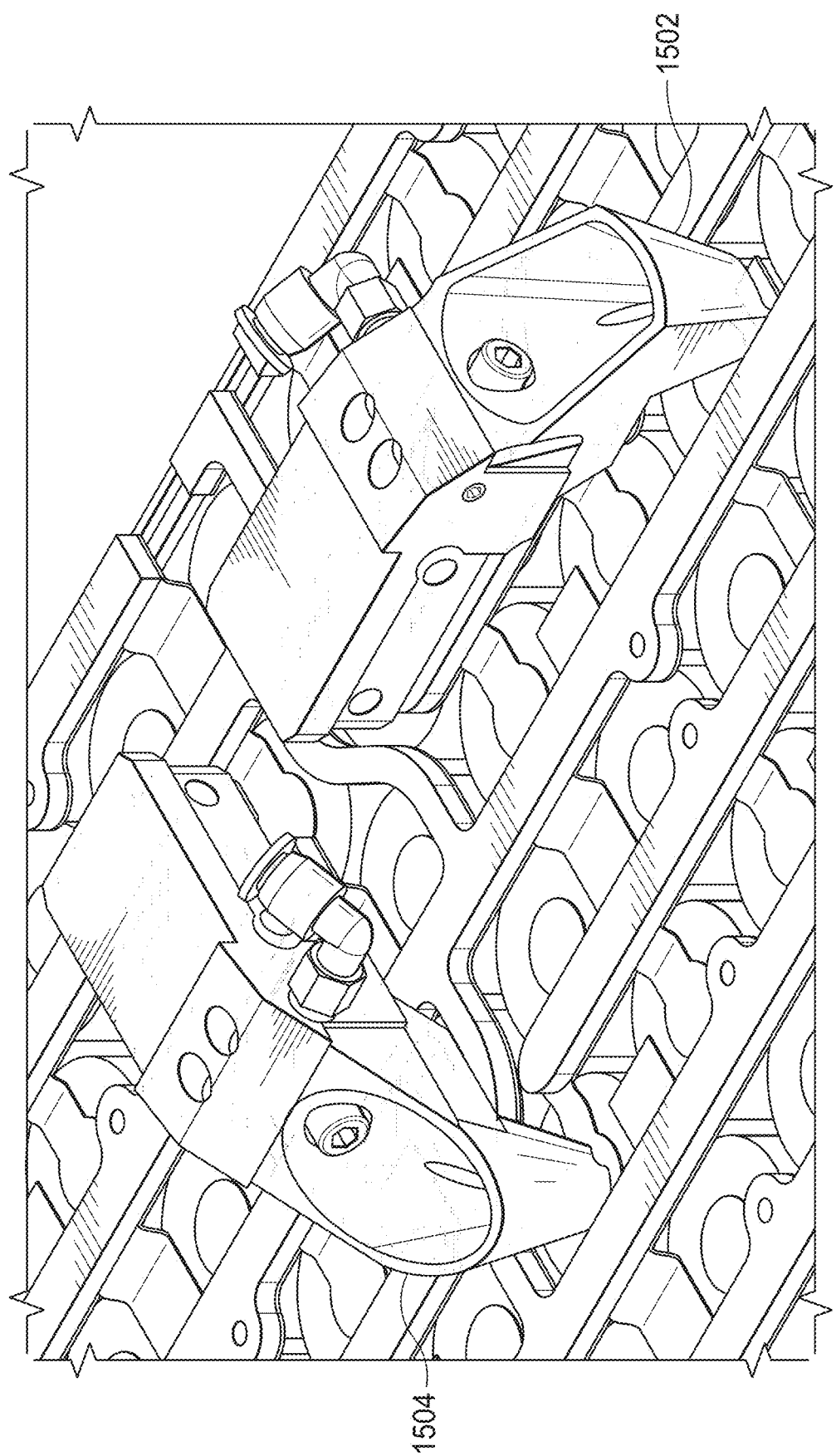
FIGS. 15A and 15B illustrate an example technique for laser welding of interconnects to batteries in an interconnect assembly according to this disclosure.
Figure 15B:
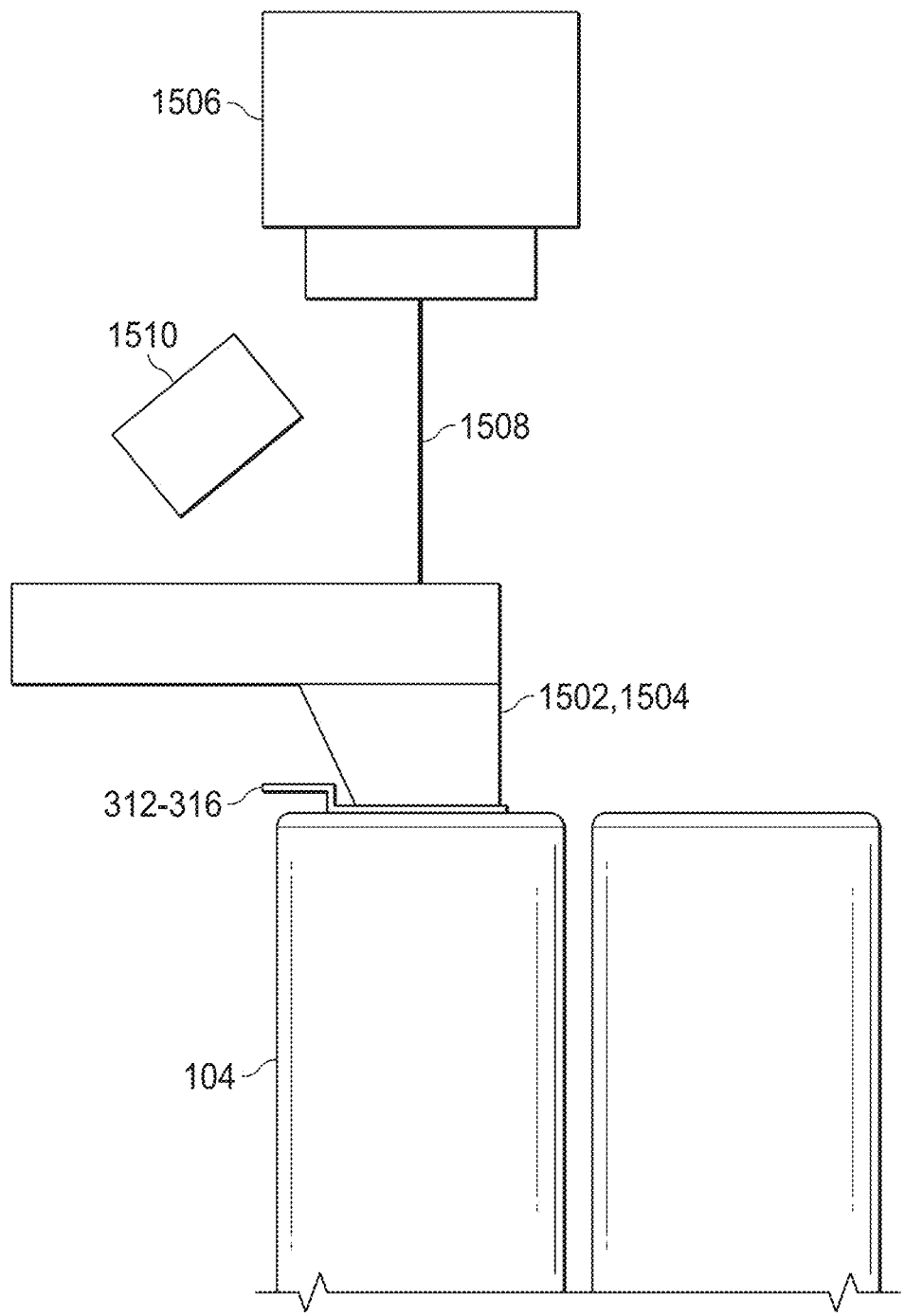

FIGS. 15A and 15B illustrate an example technique for laser welding of interconnects 312-316 to batteries 104 in an interconnect assembly 100 according to this disclosure. As shown in FIG. 4 above, each of the interconnects 312-316 may include two approximately 90° bends in order to bring large portions of the interconnects 312-316 into suitable positions for attachment to the batteries 104. This can be accomplished as shown in FIGS. 15A and 15B using one or more clamps 1502-1504, each of which can include a passageway allowing a laser source 1506 to provide a welding laser beam 1508 through the clamp 1502-1504. The laser beam 1508 can thereby weld an interconnect 312-316 being depressed by the clamp 1502-1504 onto an underlying portion of a battery 104. Since each clamp 1502-1504 can depress a portion of the interconnect 312-316 being welded, this helps to ensure good physical contact between the interconnect 312-316 and the underlying portion of the battery 104.

The design of the interconnect assembly 100 itself also provides adequate space for the clamps 1502-1504 to be used to weld the various interconnects 312-316 to the batteries 104. If necessary, the design of the interconnect assembly 100, such as the widths or heights of the fingers 310, can be adjusted to provide adequate space for the clamps 1502-1504 while still supporting adequate current-transporting and temperature-handling capabilities of the conductive interconnect layers 206, 206'.

Note that each of the interconnects 312-316 shown in FIG. 4 may have a small portion that projects substantially laterally from its associated finger 310 prior to being bent downward. This can provide an amount of flexibility or bend relief in order to comply with the application of the clamps 1502-1504. In some cases, the portions of the interconnects 312-316 that project substantially laterally from the fingers 310 may extend by about 1.0 to about 1.4 millimeters, although other lengths of these portions of the interconnects 312-316 may be used.

The interconnect retainers 202, 202' and the cell retainers 108*a*, 108*b* can also cooperate to help hold the batteries 104 in desired positions while reducing possible movements of the batteries 104. This can help to maintain tops of the batteries 104 substantially perpendicular to the welding laser beams 1508 used to weld the interconnects 312-316 to the batteries 104. For example, the hexagonal, honeycomb, or other structures 802 of the interconnect retainers 202, 202' can help reduce the possible variation in the positions of the batteries 104 within the structures 802. In some embodiments, the hexagonal shape of the structures 802 also helps to enable a more uniform nominal thickness in the interconnect retainers 202, 202' and limit cell friction. The nominal thickness of the walls of the structures 802 may remain relatively constant, and this can be useful in various fabrication processes for the interconnect retainers 202, 202', such as plastic injection molding, as it reduces uneven cooling in a mold and therefore reduces warp. This allows for tighter tolerances to be enforced without sacrificing part costs, which make this approach even more suitable for controlling the battery array composite tolerance.

Figure 16:
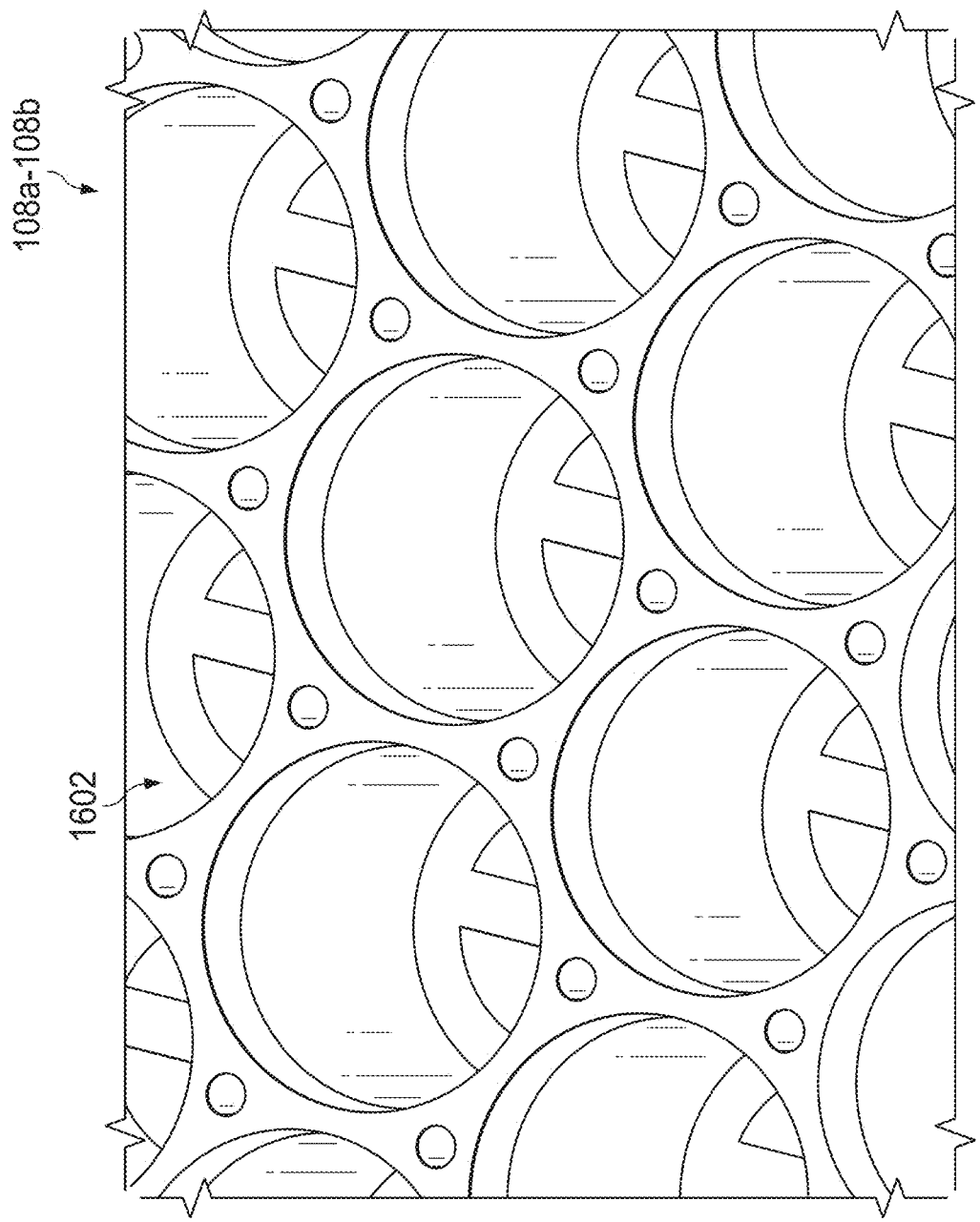
FIG. 16 illustrates an example portion of a cell retainer that forms part of a coldplate in an interconnect assembly according to this disclosure.

FIG. 16 illustrates an example portion of a cell retainer 108*a*, 108*b* that forms part of a coldplate 106 in an interconnect assembly 100 according to this disclosure. As shown in FIG. 16, each cell retainer 108*a*, 108*b* may include a number of recesses 1602, and each recess 1602 can be sized and shaped to receive an end portion of a battery 104. The spacing of the recesses 1602 defines the density of the batteries 104 in the interconnect assembly 100. In some embodiments, the recesses 1602 may be somewhat oversized relative to the outer diameters of the batteries 104, which may facilitate faster or easier insertion of the batteries 104 into the recesses 1602. While this may allow for some displacement of the batteries 104, the use of the hexagonal, honeycomb, or other structures 802 in the interconnect retainers 202, 202' can help the batteries 104 to be suitably positioned for attachment to the interconnects 312-316.

Even if some very small displacements to the tops of the batteries 104 may exist in the interconnect assembly 100, a manufacturing or processing system may be configured to accommodate these displacements. For example, a vision system 1510 as shown in FIG. 15B may be used to identify the locations of the cathodes 402 and anodes 404 of the batteries 104 in order to facilitate accurate welding of the interconnects 312-316 to the cathodes 402 and anodes 404. For example, in some cases, the vision system 1510 may use the outer diameter of the batteries 104 to identify weld locations. In other cases, each battery 104 may include a cell gasket that is visible along the inner edge of the battery's anode 404, and the vision system 1510 may use the locations of the cell gaskets to identify weld locations.

Note that the ability to use features like outer diameters or cell gasket locations depends on the ability of the vision system 1510 to actually view those features of the batteries 104. In the various embodiments of the interconnect assembly 100 described above, the outer diameters and/or cell gaskets of the batteries 104 may be viewed much more easily compared to other approaches. This helps to facilitate manufacture of the interconnect assembly 100 in a more automated manner.

Although FIGS. 15A and 15B illustrate one example of a technique for laser welding of interconnects 312-316 to batteries 104 in an interconnect assembly 100 and FIG. 16 illustrates one example portion of a cell retainer 108a, 108b that forms part of a coldplate 106 in an interconnect assembly 100, various changes may be made to FIGS. 15A, 15B, and 16. For example, any other suitable technique may be used to attach interconnects 312-316 to batteries 104 in an interconnect assembly 100. Also, the cell retainers 108a, 108b may have any suitable numbers and arrangements of recesses 1602 for batteries 104.

Figure 17:
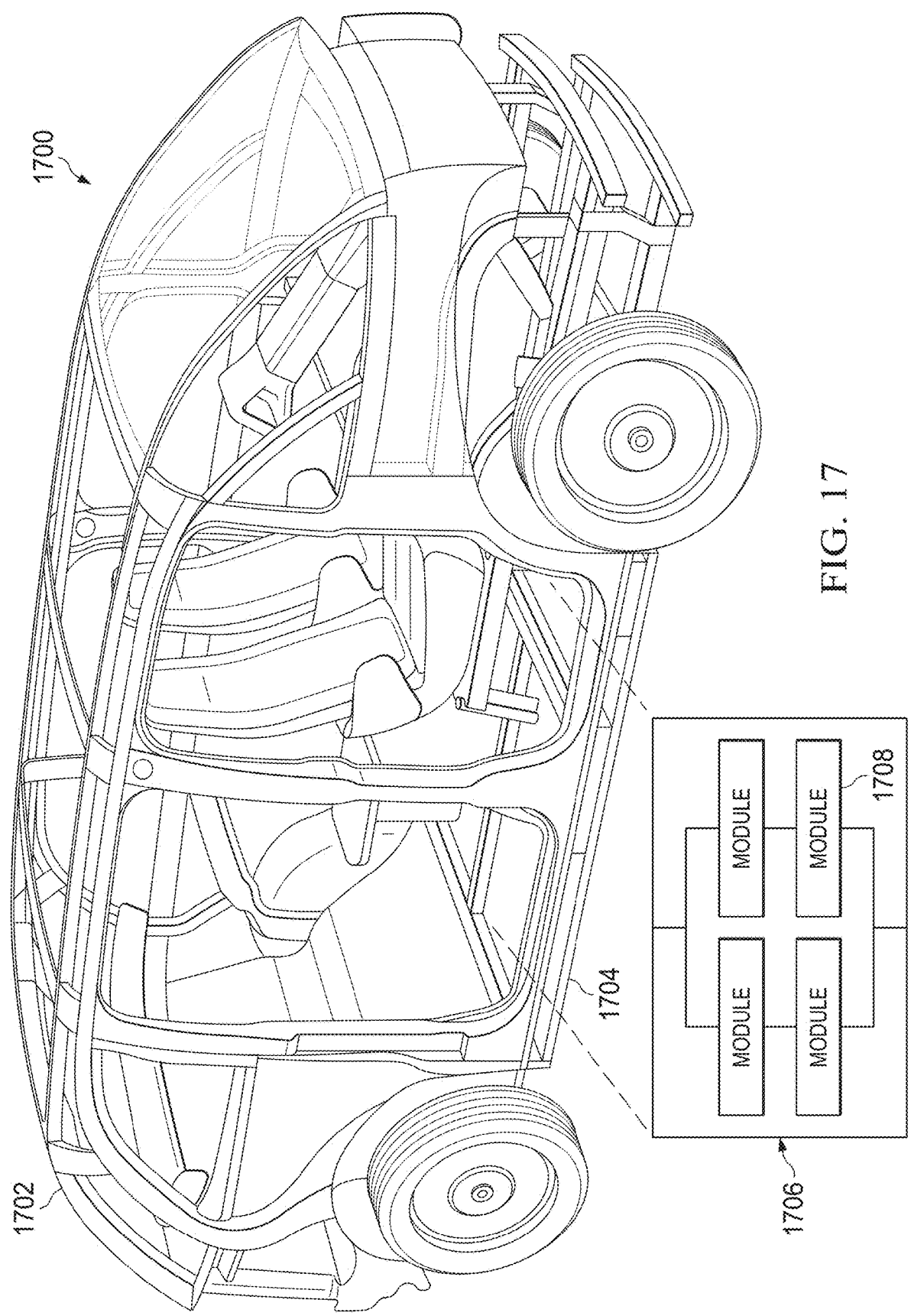
FIG. 17 illustrates an example electric vehicle containing one or more interconnect assemblies according to this disclosure.

FIG. 17 illustrates an example electric vehicle 1700 containing one or more interconnect assemblies according to this disclosure. As shown in FIG. 17, the electric vehicle 1700 generally includes a vehicle body 1702 attached to a vehicle base 1704 (which is also sometimes referred to as a skateboard). The vehicle body 1702 in this example takes the form of a passenger van, although vehicle bodies for other types of vehicles (such as sedans, trucks, or other vehicle types) may be used. The vehicle base 1704 includes many of the components used to move and stop the electric vehicle 1700, such as one or more electric motors, brake systems, suspensions, transmissions, and other components.

In this example, the vehicle base 1704 includes a battery subsystem 1706, which includes one or more power supply modules 1708. The battery subsystem 1706 is generally responsible for providing electrical power from the one or more power supply modules 1708 to other components of the electric vehicle 1700 during use. The battery subsystem 1706 is also generally responsible for recharging the one or more power supply modules 1708.

Each power supply module 1708 may represent an instance of the interconnect assembly 100, which can be coupled to each other or to other components of the electric vehicle 1700 using their terminal connectors 114a-114b. As shown here, if multiple power supply modules 1708 are present, one or more power supply modules 1708 may be coupled in series and/or one or more power supply modules 1708 may be coupled in parallel. The series and parallel couplings of the power supply modules 1708 can vary based on, among other things, the electrical voltage and electrical current that can be provided by each power supply module 1708 and the electrical voltage and electrical current needed by the electric vehicle 1700.

Although FIG. 17 illustrates one example of an electric vehicle 1700 containing one or more interconnect assemblies, various changes may be made to FIG. 17. For example, one or more interconnect assemblies 100 may be used in any other suitable vehicles. Also, one or more interconnect assemblies may be used to provide electrical power to any other suitable device or system.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   an interconnect assembly configured to receive and retain multiple batteries, the interconnect assembly comprising a retainer configured to receive portions of the batteries and a conductive interconnect layer carried by the retainer;
   wherein the conductive interconnect layer comprises a first layer of conductive material having a first thickness and a second layer of conductive material having a second thickness less than the first thickness, the first layer of conductive material carried by and in direct contact with the second layer of conductive material to form the conductive interconnect layer; and
   wherein the second layer of conductive material comprises multiple interconnects configured to be coupled to cathodes and anodes of the batteries.

2. The apparatus of claim 1, wherein:
   the first layer of conductive material comprises multiple elongated conductive fingers; and
   the interconnects extend from the elongated conductive fingers to the cathodes and anodes of the batteries and electrically couple the elongated conductive fingers to the batteries.

3. The apparatus of claim 2, wherein:
   the conductive interconnect layer comprises multiple conductive structures, each conductive structure comprising multiple elongated conductive fingers;
   a first conductive structure of the multiple conductive structures comprises interconnects coupled to cathodes of batteries;
   a second conductive structure of the multiple conductive structures comprises interconnects coupled to anodes of batteries; and
   at least one third conductive structure of the multiple conductive structures is positioned between the first and second conductive structures, each of the at least one third conductive structure comprising interconnects coupled to cathodes of batteries and interconnects coupled to anodes of batteries.

4. The apparatus of claim 3, wherein:
the conductive structures are coupled to different sets of parallel-coupled batteries; and
the conductive structures are coupled in series with one another.

5. The apparatus of claim 2, wherein: the conductive interconnect layer further comprises one or more balancing conductors, each balancing conductor coupled to two or more of the elongated conductive fingers that are coupled to different batteries, each balancing conductor configured to transport electrical current between the two or more elongated conductive fingers.

6. The apparatus of claim 1, wherein:
the interconnect assembly comprises multiple sub-modules, each sub-module comprising a retainer and a conductive interconnect layer; and
the sub-modules are electrically coupled to one another.

7. The apparatus of claim 6, wherein:
each sub-module further comprises multiple conductive forks coupled to the conductive interconnect layer of the sub-module; and
the interconnect assembly further comprises multiple busbars electrically coupling the conductive forks of the sub-modules in order to electrically couple the sub-modules.

8. The apparatus of claim 7, wherein the conductive forks are coupled to the conductive interconnect layers of the sub-modules at multiple locations such that multiple electrical currents flowing through different paths in the sub-modules are balanced.

9. The apparatus of claim 6, wherein the interconnect assembly further comprises a coldplate positioned between the sub-modules, the coldplate comprising recesses configured to receive additional portions of the batteries in the sub-modules.

10. The apparatus of claim 1, wherein:
the interconnect assembly further comprises a sensor assembly;
the sensor assembly comprises a ribbon cable carrying a thermistor and multiple voltage contact points;
the thermistor is configured to sense a temperature in the interconnect assembly; and
the voltage contact points are configured to be coupled to conductive tabs of the
conductive interconnect layer and receive voltages at the conductive tabs.

11. A system comprising:
one or more power supply modules configured to provide electrical power, each power supply module comprising:
an interconnect assembly configured to receive and retain multiple batteries, the interconnect assembly comprising (i) a retainer configured to receive portions of the batteries, (ii) a conductive interconnect layer carried by the retainer, and (iii) terminal connectors electrically coupled to the batteries and configured to provide at least a portion of the electrical power;
wherein the conductive interconnect layer comprises a first layer of conductive material having a first thickness and a second layer of conductive material having a second thickness less than the first thickness, the first layer of conductive material carried by and in direct contact with the second layer of conductive material to form the conductive interconnect layer; and
wherein the second layer of conductive material comprises multiple interconnects configured to be coupled to cathodes and anodes of the batteries.

12. The system of claim 11, wherein, in each power supply module:
the first layer of conductive material comprises multiple elongated conductive fingers; and
the interconnects extend from the elongated conductive fingers to the cathodes and anodes of the batteries and electrically couple the elongated conductive fingers to the batteries.

13. The system of claim 12, wherein, in each power supply module:
the conductive interconnect layer comprises multiple conductive structures, each conductive structure comprising multiple elongated conductive fingers;
a first conductive structure of the multiple conductive structures comprises interconnects coupled to cathodes of batteries;
a second conductive structure of the multiple conductive structures comprises interconnects coupled to anodes of batteries; and
at least one third conductive structure of the multiple conductive structure is positioned between the first and second conductive structures, each of the at least one third conductive structure comprising interconnects coupled to cathodes of batteries and interconnects coupled to anodes of batteries.

14. The system of claim 13, wherein, in each power supply module:
the conductive structures are coupled to different sets of parallel-coupled batteries; and
the conductive structures are coupled in series with one another.

15. The system of claim 12, wherein, in each power supply module, the conductive interconnect layer further comprises one or more balancing conductors, each balancing conductor coupled to two or more of the elongated conductive fingers that are coupled to different batteries, each balancing conductor configured to transport electrical current between the two or more elongated conductive fingers.

16. The system of claim 11, wherein, in each power supply module:
the interconnect assembly comprises multiple sub-modules, each sub-module comprising a retainer and a conductive interconnect layer; and
the sub-modules are electrically coupled to one another.

17. The system of claim 16, wherein, in each power supply module:
each sub-module further comprises multiple conductive forks coupled to the conductive interconnect layer of the sub- module; and
the interconnect assembly further comprises multiple busbars electrically coupling the conductive forks of the sub- modules in order to electrically couple the sub-modules.

18. The system of claim 17, wherein, in each power supply module, the conductive forks are coupled to the conductive interconnect layers of the sub-modules at multiple locations such that multiple electrical currents moving through different paths in the sub-modules are balanced.

19. The system of claim 16, wherein, in each power supply module, the interconnect assembly further comprises a coldplate positioned between the sub-modules, the coldplate comprising recesses configured to receive additional portions of the batteries in the sub-modules.

20. The system of claim 11, wherein, in each power supply module:
- the interconnect assembly further comprises a sensor assembly;
- the sensor assembly comprises a ribbon cable carrying a thermistor and multiple voltage contact points;
- the thermistor is configured to sense a temperature in the interconnect assembly; and
- the voltage contact points are configured to be coupled to conductive tabs of the conductive interconnect layer and receive voltages at the conductive tabs.

21. The system of claim 11, wherein the system comprises multiple power supply modules electrically coupled together using the terminal connectors.

22. A method comprising:
- inserting multiple batteries into an interconnect assembly that is configured to receive and retain the batteries, the interconnect assembly comprising a retainer configured to receive portions of the batteries and a conductive interconnect layer carried by the retainer, the conductive interconnect layer comprising a first layer of conductive material having a first thickness and a second layer of conductive material having a second thickness less than the first thickness, the first layer of conductive material carried by and in direct contact with the second layer of conductive material to form the conductive interconnect layer; and
- attaching interconnects in the second layer of conductive material to cathodes and anodes of the batteries.

23. The method of claim 22, wherein attaching the interconnects to the cathodes and anodes of the batteries comprises using laser welding.

* * * * *